(12) United States Patent
Bernard et al.

(10) Patent No.: US 9,027,776 B2
(45) Date of Patent: May 12, 2015

(54) ASSEMBLY HAVING A HOLDING TORIC BODY FOR CLOSING AN ANNULAR COLLAR, OR CONNECTING TO SAME, WHICH CAN BE RAPIDLY POSITIONED AND REMOVED AND USED IN THE BIOPHARAMACEUTICAL FIELD

(75) Inventors: Frederic Bernard, La Cadiere d'Azur (FR); Eric Chevalier, Paris (FR)

(73) Assignee: Sartorius Stedim FMT SAS, Aubagne (FR)

( * ) Notice: Subject to any disclaimer, the term of this patent is extended or adjusted under 35 U.S.C. 154(b) by 824 days.

(21) Appl. No.: 13/254,945

(22) PCT Filed: Mar. 5, 2010

(86) PCT No.: PCT/FR2010/050383
§ 371 (c)(1),
(2), (4) Date: Nov. 1, 2011

(87) PCT Pub. No.: WO2010/100388
PCT Pub. Date: Sep. 10, 2010

(65) Prior Publication Data
US 2012/0037633 A1 Feb. 16, 2012

(30) Foreign Application Priority Data

Mar. 6, 2009 (FR) ...................................... 09 51430

(51) Int. Cl.
*B65D 53/02* (2006.01)
*F16J 13/06* (2006.01)
(Continued)

(52) U.S. Cl.
CPC .............. *F16J 13/065* (2013.01); *B65D 88/26* (2013.01); *B65D 88/54* (2013.01); *B65D 88/68* (2013.01);
(Continued)

(58) Field of Classification Search
CPC ................................. F16J 15/46; B65D 53/02
USPC .................................................. 220/378, 232
See application file for complete search history.

(56) References Cited

U.S. PATENT DOCUMENTS 794,987 A * 7/1905 Kneuper ........................ 277/583
2,201,322 A * 5/1940 Schwartz ...................... 220/232
(Continued)

FOREIGN PATENT DOCUMENTS

EP 0 800 480 10/1997
EP 0 865 382 9/1998
(Continued)

OTHER PUBLICATIONS

International Search Report dated Sep. 15, 2010, corresponding to the PCT application.

*Primary Examiner* — Mickey Yu
*Assistant Examiner* — Niki Eloshway
(74) *Attorney, Agent, or Firm* — Young & Thompson

(57) ABSTRACT

A first piece mounted in a fixed and rigid manner on a rigid annular collar of a second piece having an end opening, includes a transversal wall; an annular wall forming a skirt, whose inner face includes a part having a larger diameter and a part having a smaller diameter; a holding toric body adjacent to the inner face, deformable between a retracted state and an expanded state, and filled with a swelling medium; and at least one inlet/outlet port for the swelling media, communicating with the holding body. The first piece is dimensioned in relation to the collar, so as to enable the first piece to be slipped onto, or removed from, the second piece, when the holding body is in the retracted state, and to be mounted onto the collar in a fixed, rigid and tight manner, when the holding body is in the expanded state.

28 Claims, 18 Drawing Sheets

(51) Int. Cl.
*B65D 88/54* (2006.01)
*B65D 90/00* (2006.01)
*B65D 90/04* (2006.01)
*F16J 15/46* (2006.01)
*B65D 53/00* (2006.01)
*B65D 88/26* (2006.01)
*B65D 88/68* (2006.01)
*B65D 90/56* (2006.01)

(52) U.S. Cl.
CPC .............. *B65D 90/00* (2013.01); *B65D 90/046* (2013.01); *B65D 90/56* (2013.01); *B65D 2590/046* (2013.01); *F16J 15/46* (2013.01)

(56) References Cited

U.S. PATENT DOCUMENTS

| | | | |
|---|---|---|---|
| 2,551,750 A * | 5/1951 | Liskey, Jr. | 114/201 R |
| 2,690,854 A | 10/1954 | Kaye | |
| 2,785,824 A * | 3/1957 | Reeves | 220/232 |
| 4,140,237 A | 2/1979 | Hickey | |
| 4,665,653 A * | 5/1987 | Franz et al. | 49/477.1 |
| 5,350,080 A | 9/1994 | Brown et al. | |
| 5,988,422 A | 11/1999 | Vallot | |
| 6,030,578 A | 2/2000 | McDonald | |
| 6,068,031 A | 5/2000 | Lataix et al. | |
| 6,657,048 B2 * | 12/2003 | Young et al. | 530/387.1 |
| 6,708,377 B2 | 3/2004 | Maunder | |
| 7,168,459 B2 | 1/2007 | Bibbo et al. | |
| 7,384,078 B2 | 6/2008 | Elliott | |
| 2002/0109355 A1 | 8/2002 | Elliott | |
| 2004/0191369 A1 | 9/2004 | Veillon | |

FOREIGN PATENT DOCUMENTS

| | | |
|---|---|---|
| EP | 0 997 155 | 5/2000 |
| EP | 1 336 572 | 8/2003 |
| EP | 1 352 851 | 10/2003 |
| EP | 1 425 227 | 6/2004 |
| EP | 1 666 368 | 6/2006 |
| EP | 1 230 505 | 7/2008 |
| FR | 2 379 450 | 9/1978 |
| FR | 2 781 202 | 1/2000 |
| GB | 2 175 966 | 12/1986 |
| WO | 97/18994 | 5/1997 |
| WO | 2005/021396 | 3/2005 |
| WO | 2007/122648 | 11/2007 |

* cited by examiner

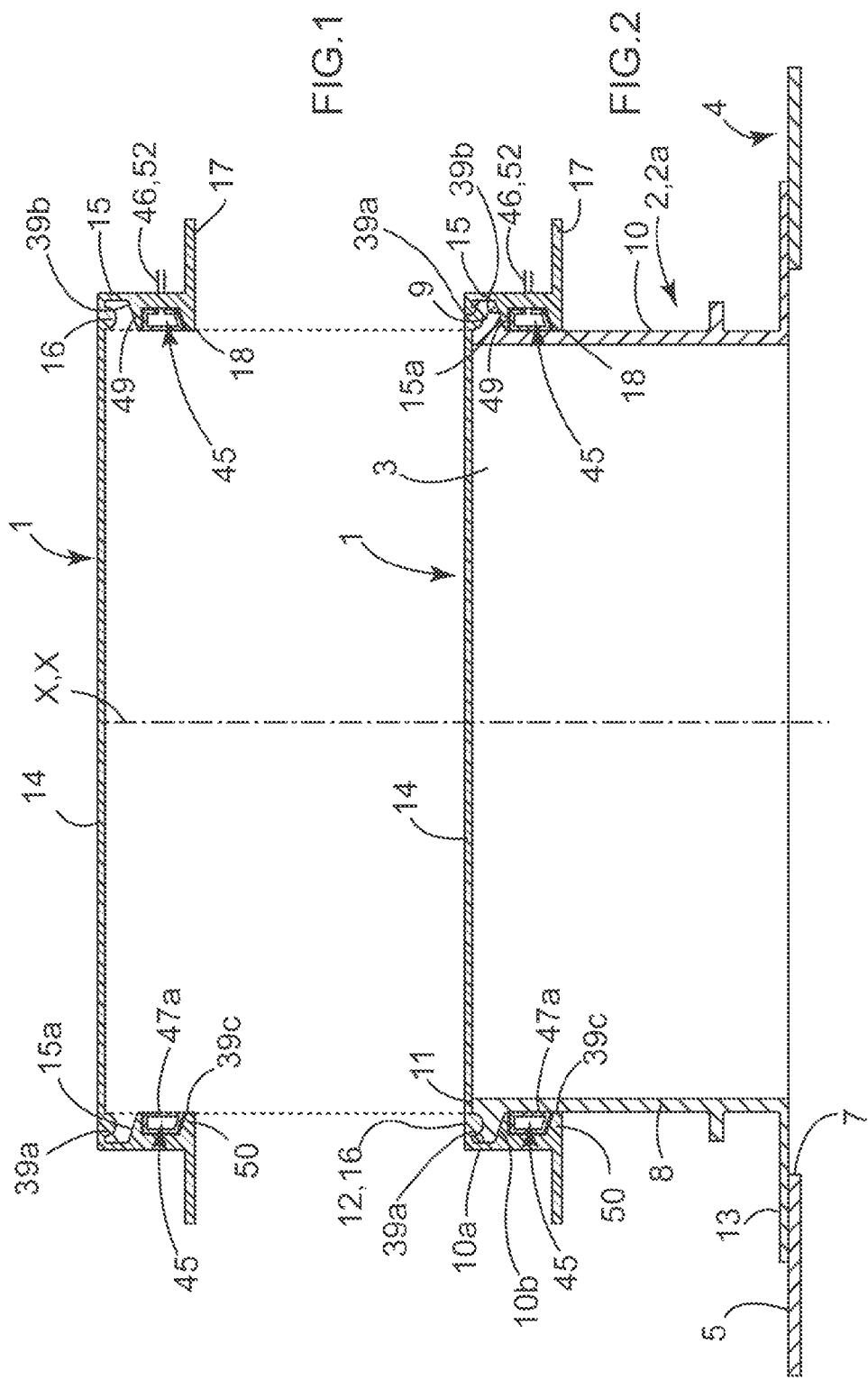

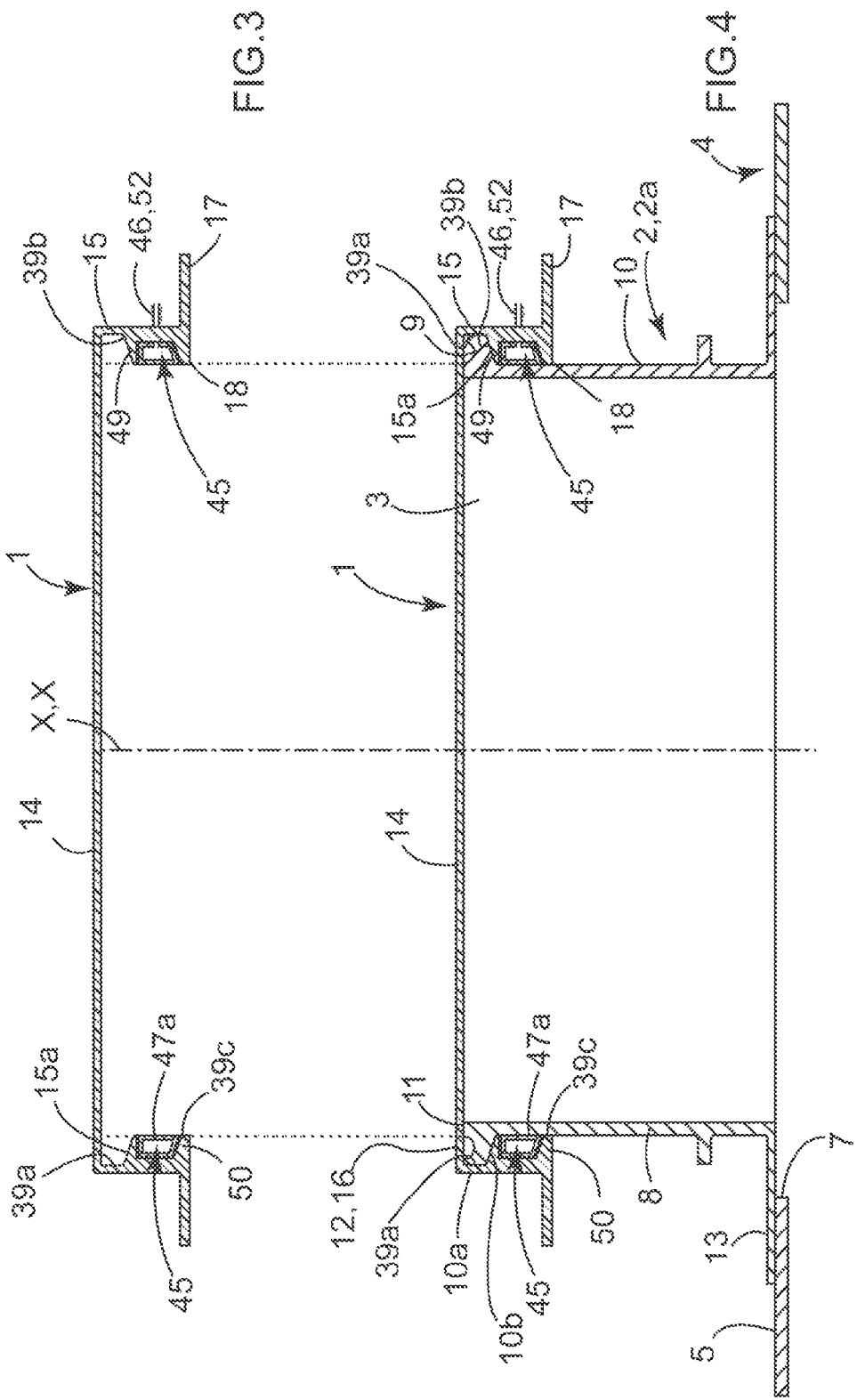

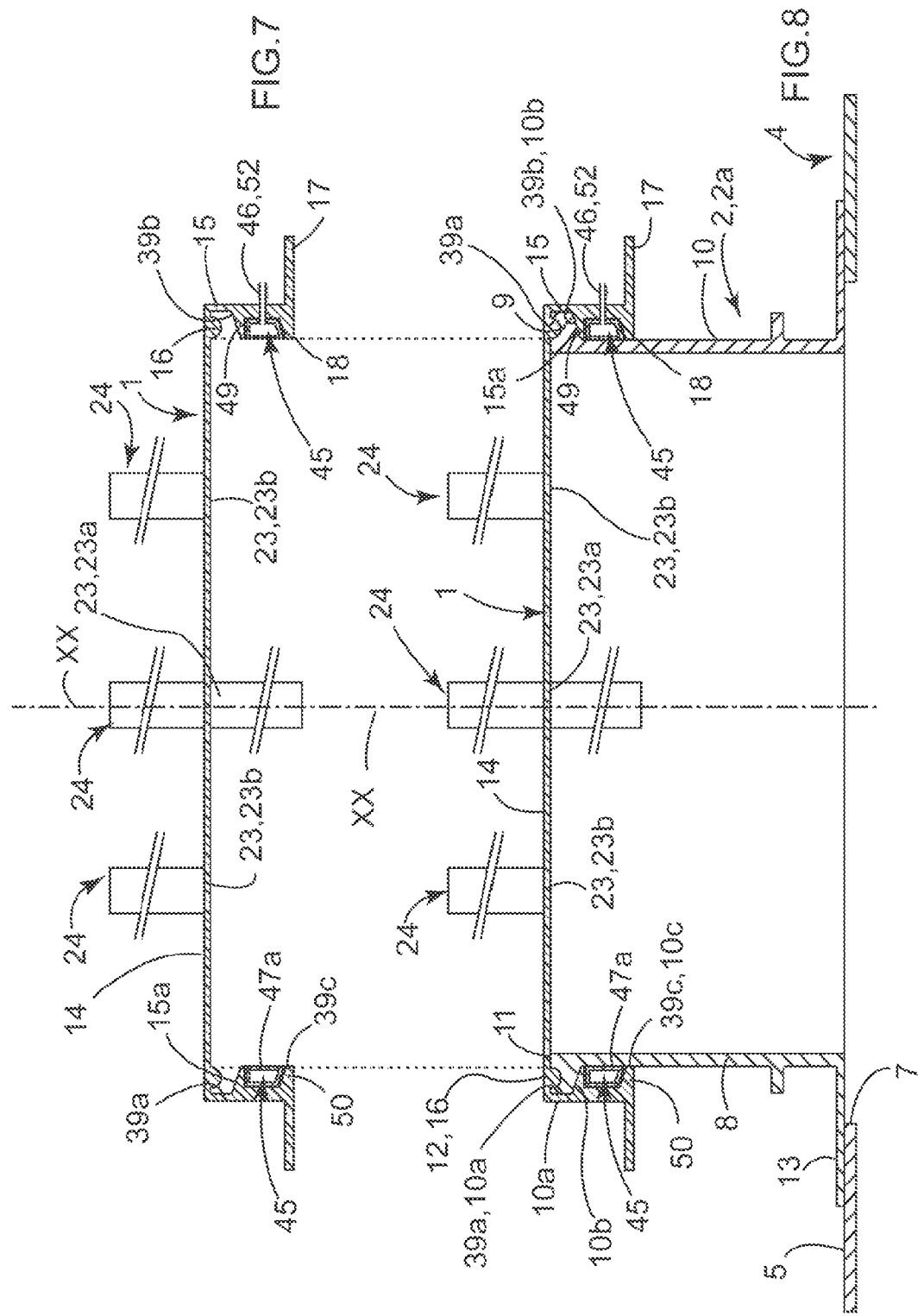

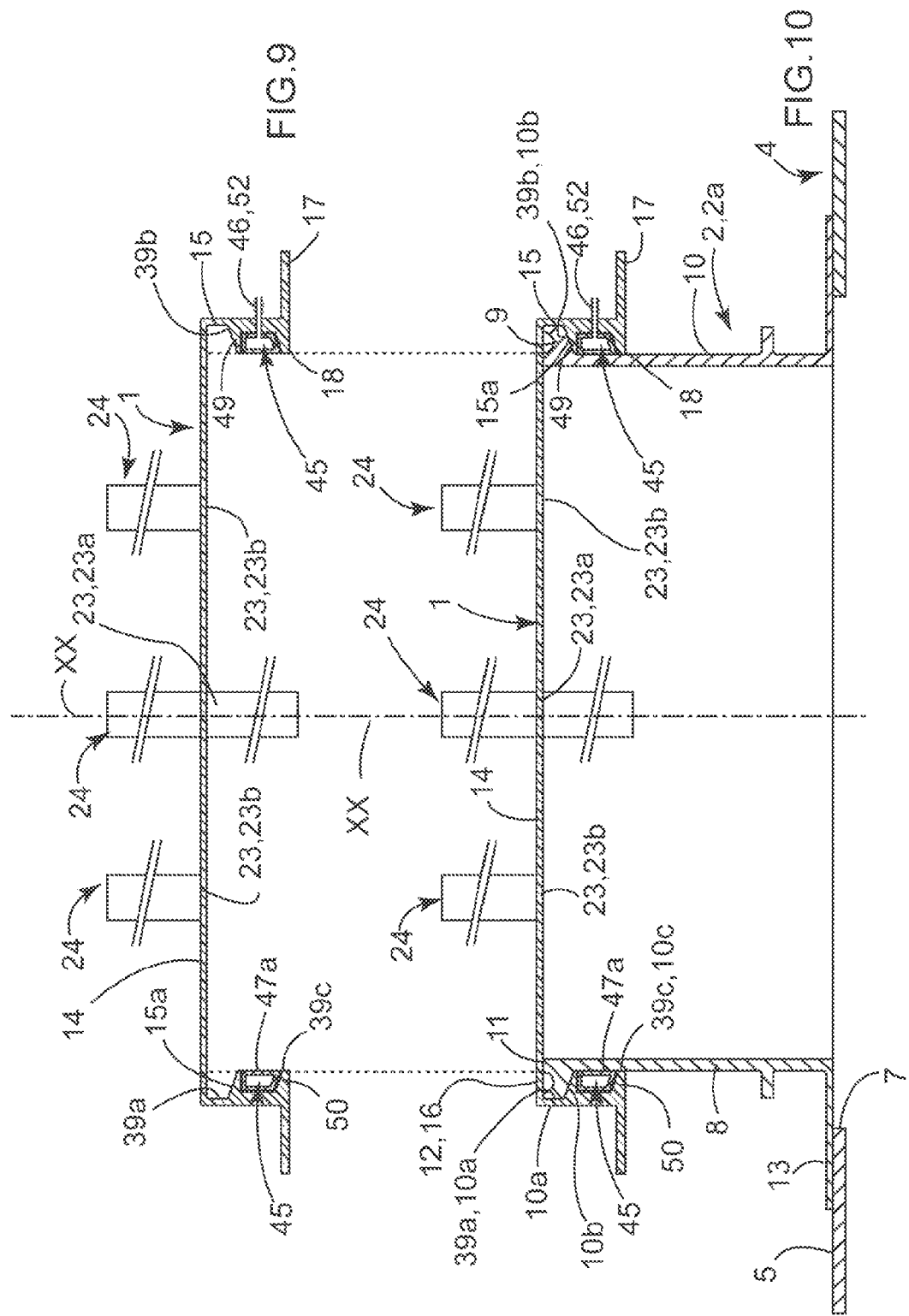

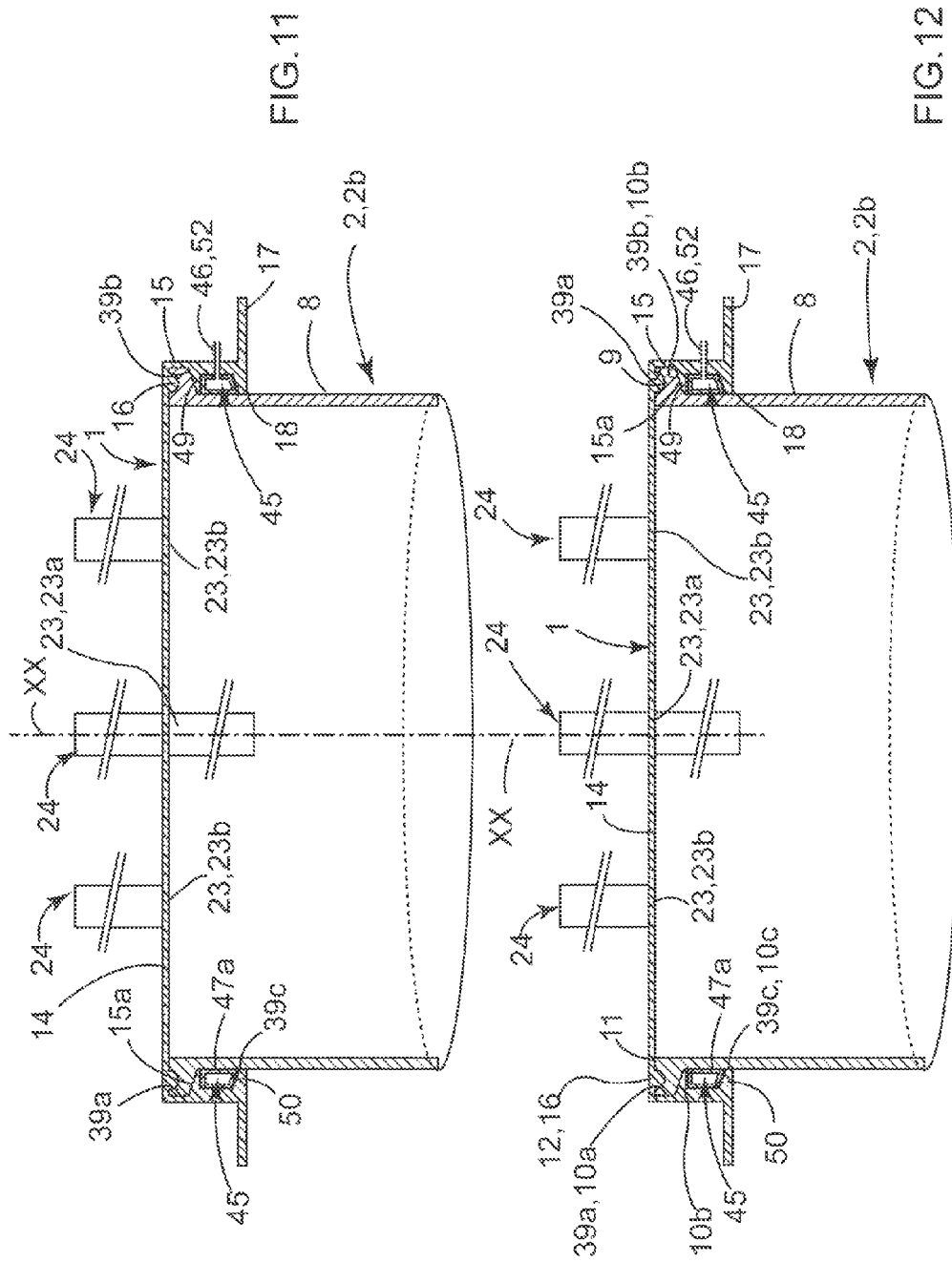

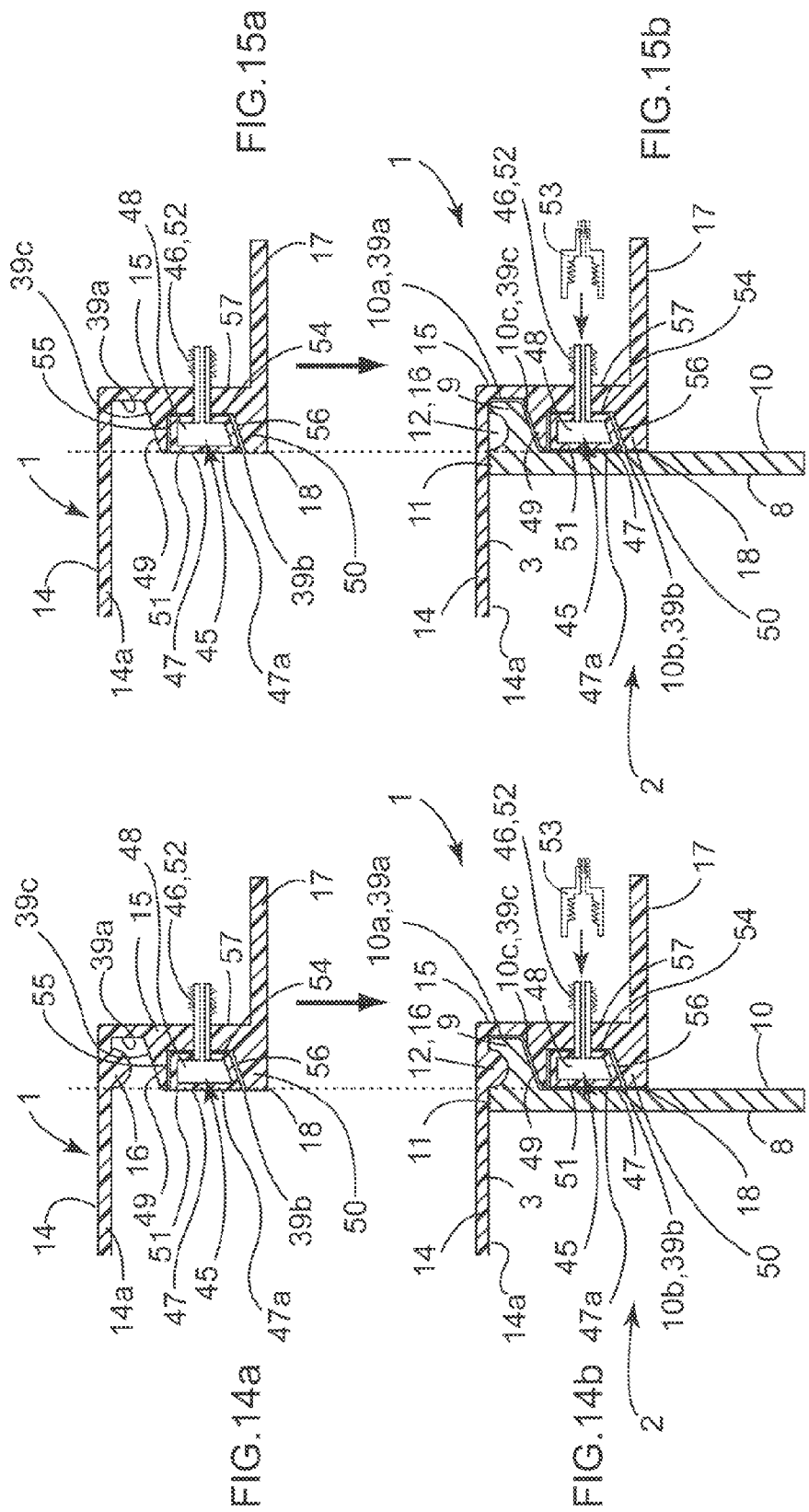

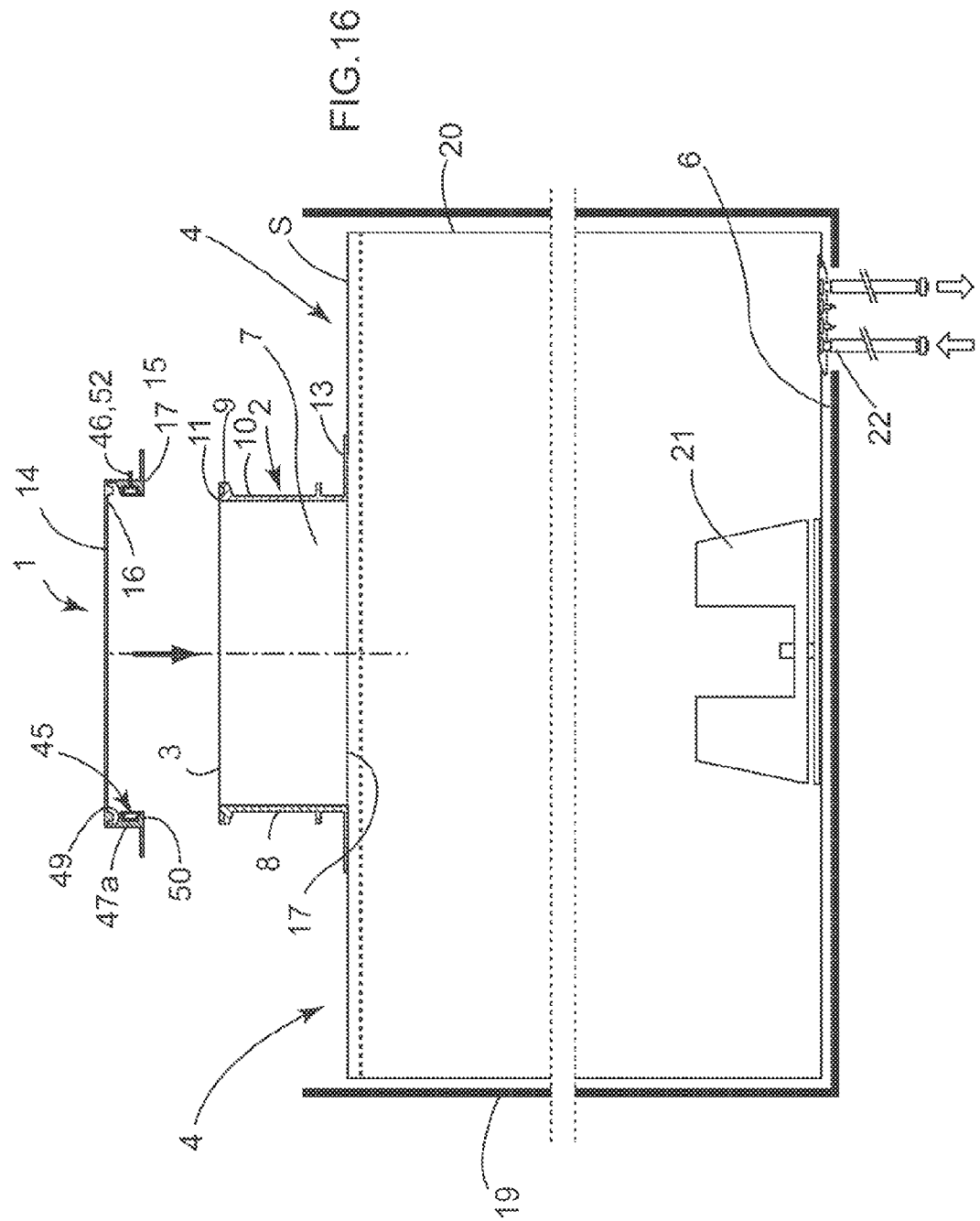

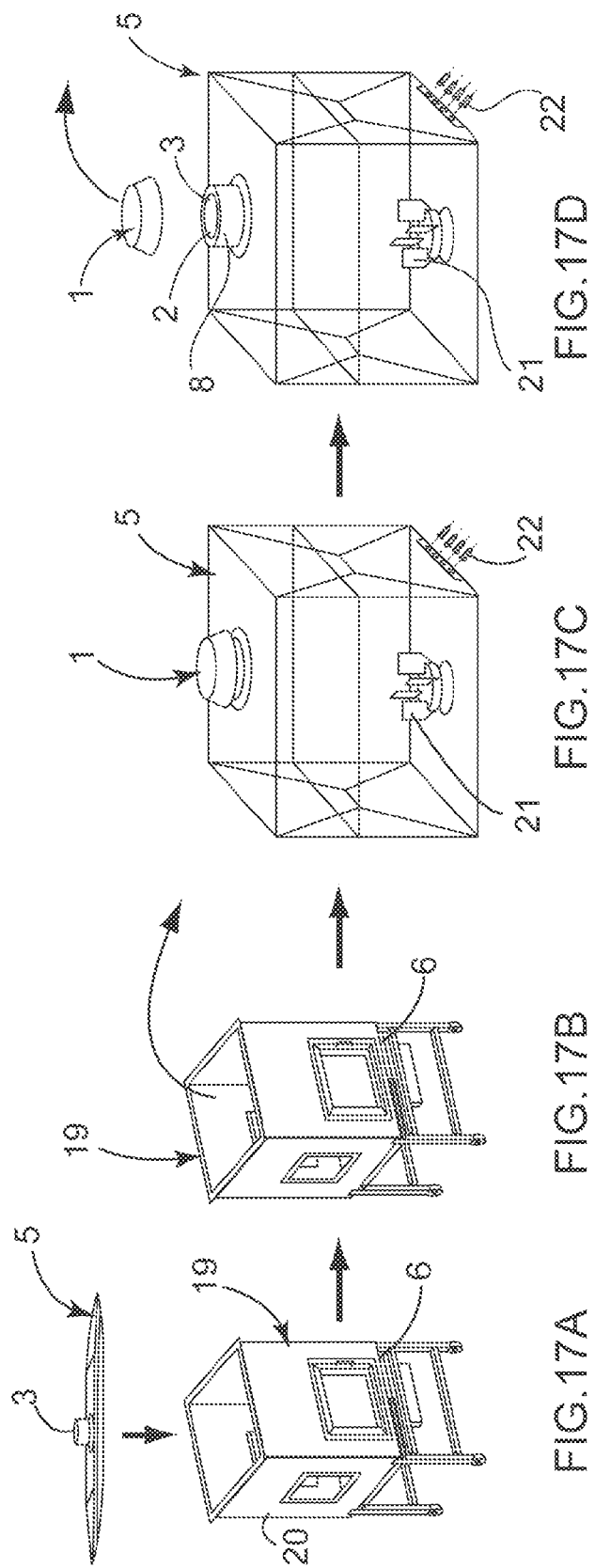

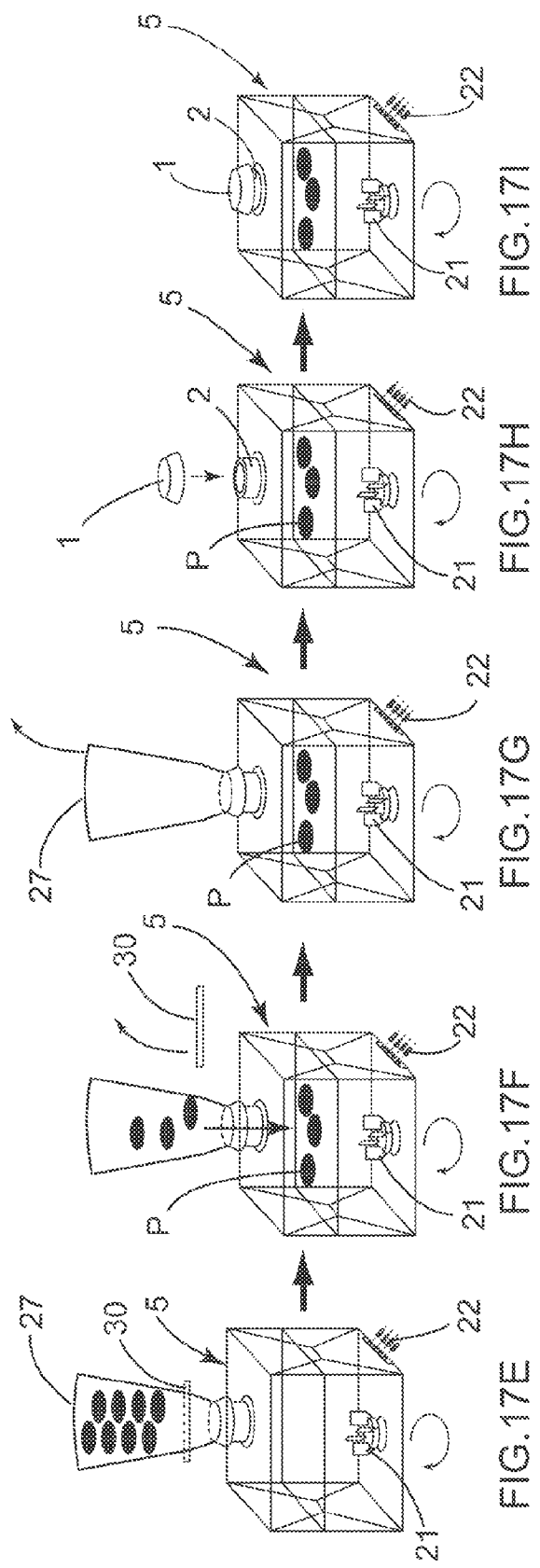

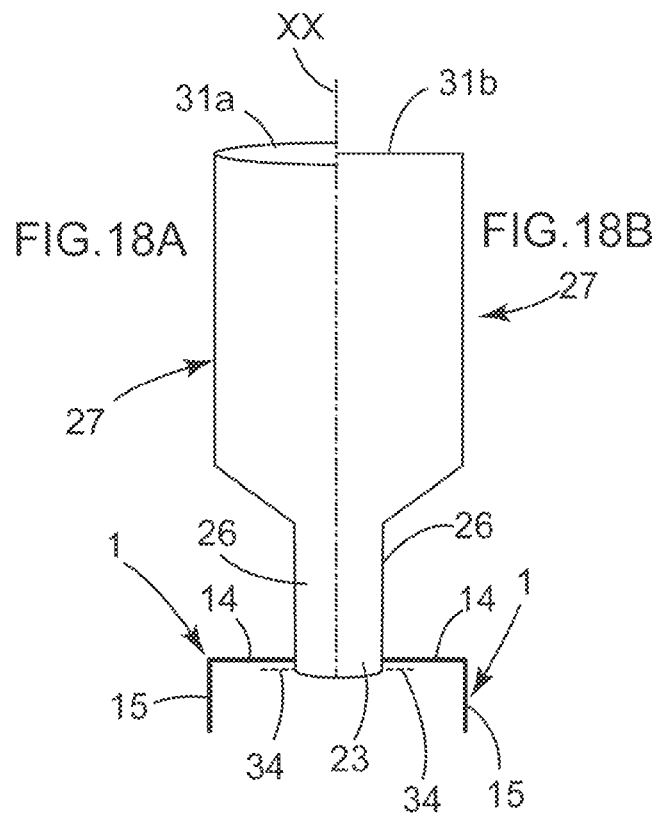
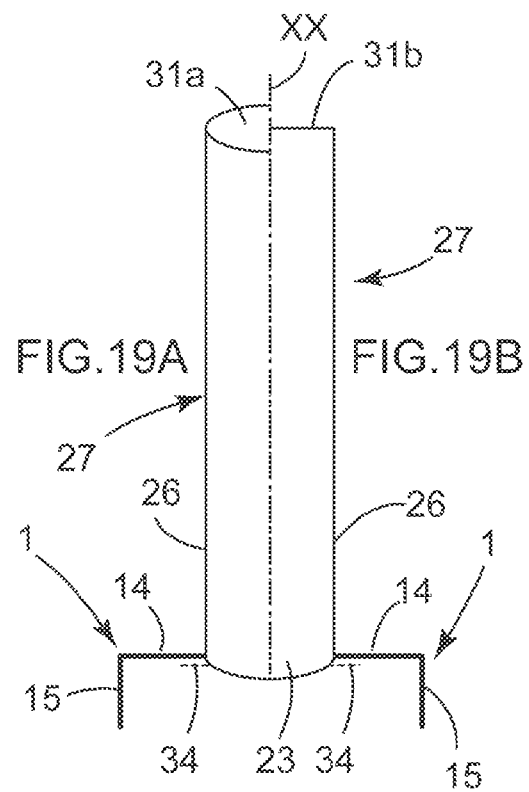

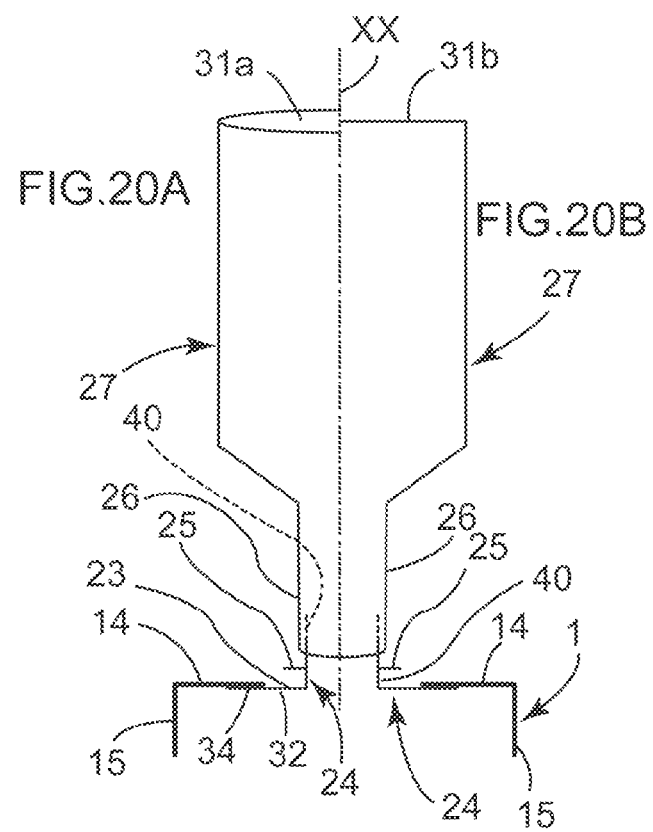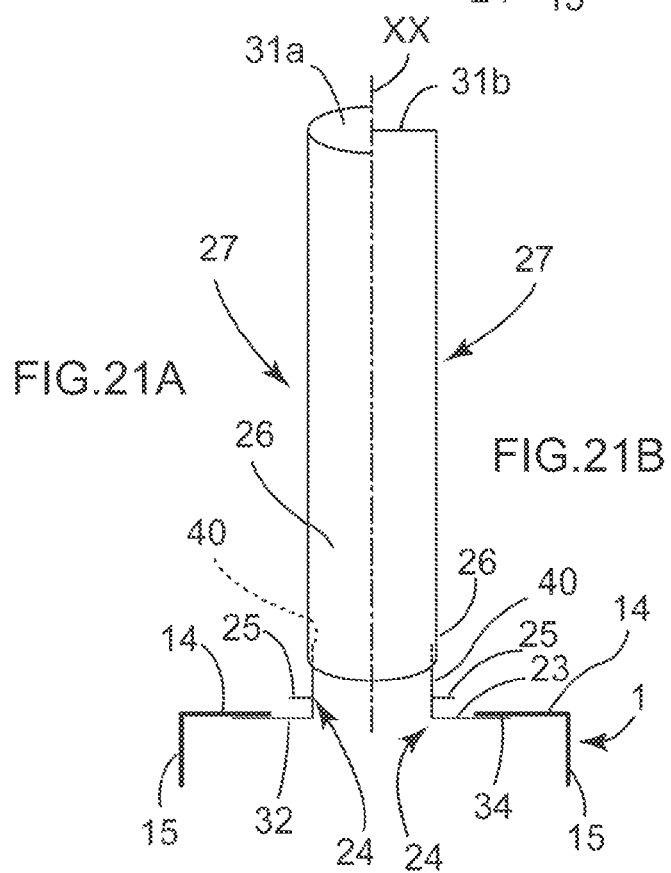

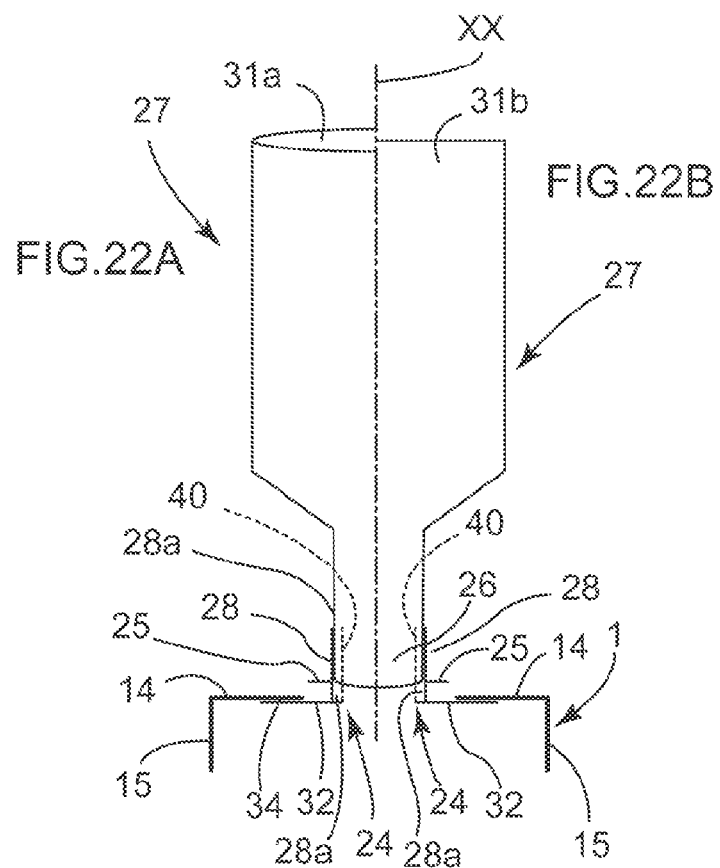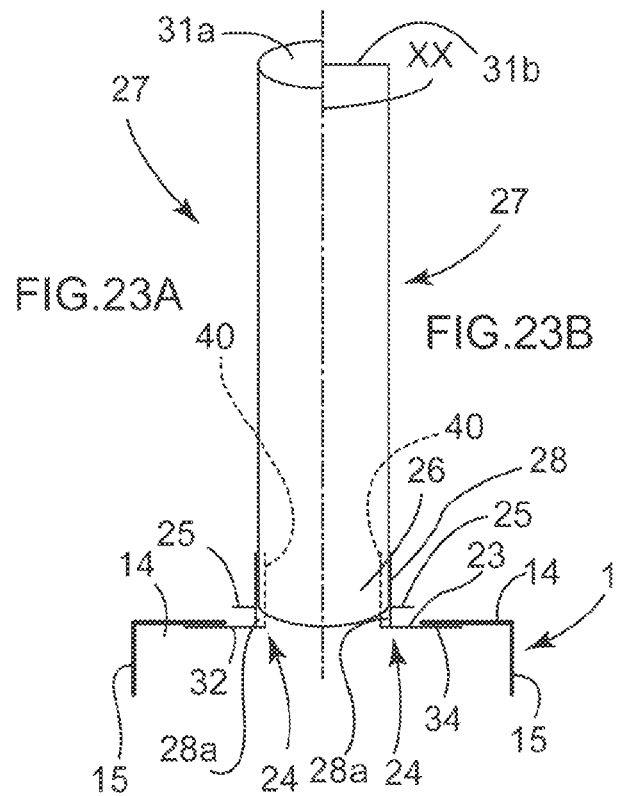

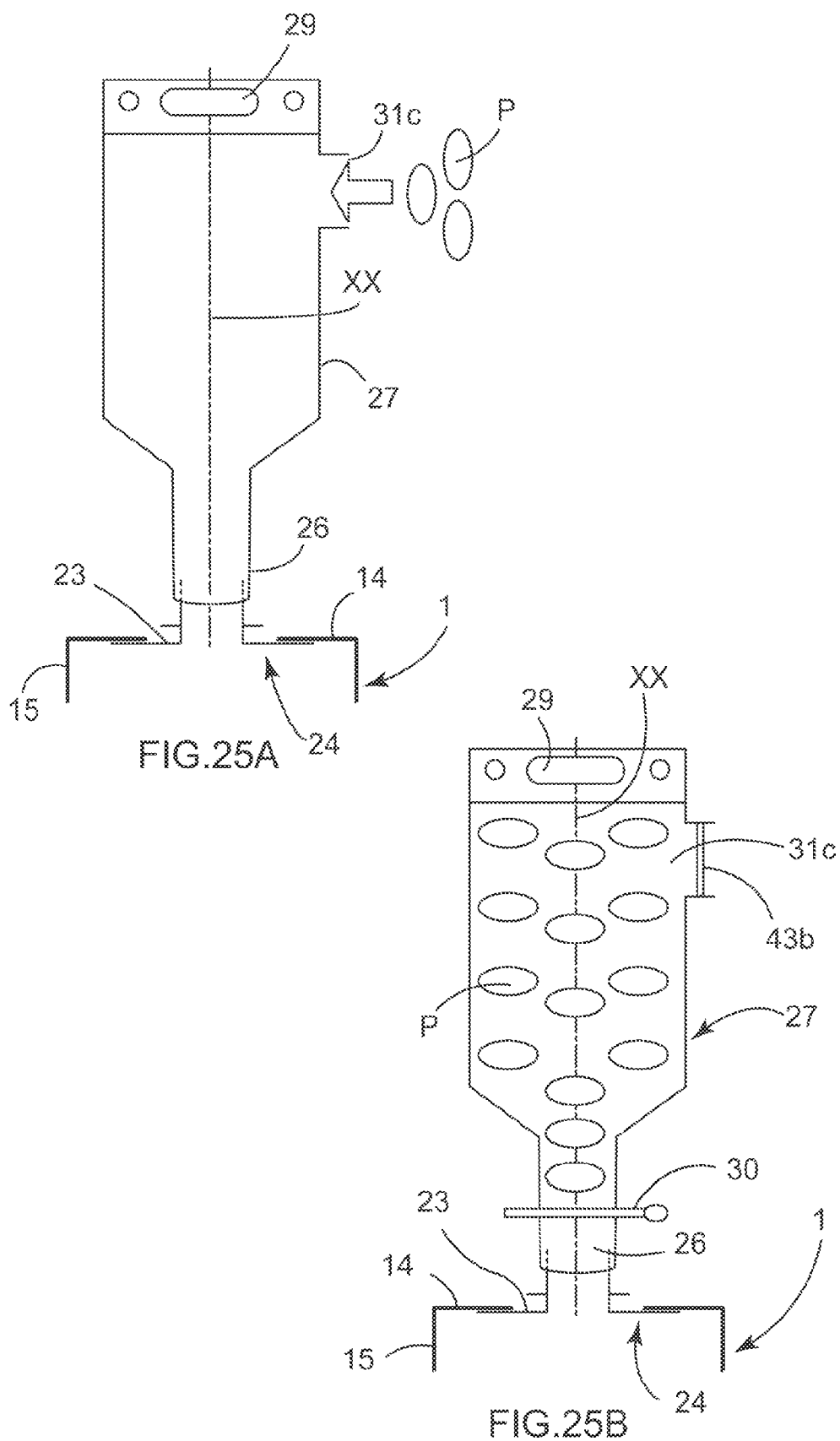

ASSEMBLY HAVING A HOLDING TORIC BODY FOR CLOSING AN ANNULAR COLLAR, OR CONNECTING TO SAME, WHICH CAN BE RAPIDLY POSITIONED AND REMOVED AND USED IN THE BIOPHARAMACEUTICAL FIELD

The invention relates to toroidal holding chamber mountings on an annular collar, in a stationary, removable and airtight manner, with quick installation and removal, specially designed for the biopharmaceutical field. The purpose of such mountings is either the sealing of the end opening formed by the rigid collar or the connection—with communication—to this collar.

It is known that in the biopharmaceutical field, the need exists to be able to mount—namely to seal or to connect with communication—in a stationary, removable and airtight manner, pieces such as—or more precisely parts of—receptacles, tubes or ports that are integrated with more or less complex units that can comprise multiple receptacles, multiple tubes, and multiple functional means, combined with one another.

For the sake of simplicity in the presentation, it is suitable to name the two pieces that are thus to be mounted or are thus mounted "first piece" and "second piece." It is also acknowledged that the object of the mounting, also referred to as an assembly, is either sealing or connection with communication, and that consequently mounting or assembly is defined as either to seal or to connect with communication.

In a traditional way, such receptacles for biopharmaceutical use were made of stainless steel and connected to one or more tubes made of plastic material or stainless steel by means of one or more clamps acting as a flange, comprising two jaws that are connected to one another, for example articulated, and tightening and locking means. The application of such embodiments in the case of receptacles for biopharmaceutical use comprising a pocket made of plastic material has been extended. These pockets are either relatively thin (sometimes called "pillow" pockets or "2D" pockets—D meaning dimensions) or, as the document FR-A-2 781 202 discloses, have two large walls and lateral gussets, so as to be able, once expanded, to assume a three-dimensional shape and to have a volume of 50 liters and more (sometimes called a 3D pocket). Such clamps, also known under the name of "tri-clamp," are the object of numerous variant embodiments, such as those described in particular in the documents EP-A-1 230 505, U.S. Pat. Nos. 6,708,377, and 7,384,078, whereby this list is not limiting. Such a tri-clamp conventionally comprises a tightening cuff that at each of its two corresponding ends has a bulge, a tightening element working structurally and functionally with the two bulges opposite. The object of the documents EP-A-0 997 155 and EP-A-1 352 851 is the implementation of such clamps or tri-clamps.

In line with the ISO 2852: 1993 Standard, one of the two pieces that is the object of the mounting or assembly, for example the first piece, has an annular part that has an end bulge toward the exterior, in the end edge of which an annular groove is provided that accommodates a sealing bead that is also annular. The other piece, then the second piece, also has an annular part that has an end bulge toward the exterior. The clamp, flange or tri-clamp is designed to be tightened on the two annular parts by keeping them firmly against one another to prevent their inadvertent disassembly and to ensure sealing.

These embodiments have a certain number of limits and drawbacks. These tri-clamps, which are conventionally for multiple use, are expensive. They are ill-suited to the increasingly common and desired case of single use (per se or for a process overall). Most often, their interior diameter does not exceed about ten centimeters, whereas more and more frequently, the use of biopharmaceutical devices that are larger in size, in particular involving openings of containers, is considered. Their installation often proves difficult, long and hazardous, to the extent where the operator has to hold the tri-clamp and maneuver it (for closing it) and simultaneously hold at least one, and even two, pieces, while keeping them perfectly positioned relative to one another. These drawbacks are unacceptable when, as is more and more often desired, the two pieces have to be able to be assembled quickly and more easily.

Ports that have external holding teeth (sometimes called "hose-barbs") are also known—for example from the document U.S. Pat. No. 5,350,080. These embodiments have a number of limitations and drawbacks. For example, their diameter is limited and does not allow large sizes, and their installation, with force, is problematic.

It is also known that in the biopharmaceutical field, there exists the need for being able to mount or assemble receptacles with sterile chambers for the purpose of a connection with communication in a stationary, rigid, removable and airtight manner. To do this, most often complex systems are used such as those that are described in the documents EP-A-0 800 480 and EP-A-0 865 382. These embodiments are well suited to their use but exclude single use.

One skilled in the art also knows that there exist a number of embodiments of sealing covers, in which a first piece that forms a cover comprises a transverse wall and a peripheral annular wall that forms a skirt, and a second piece for which the cover is designed comprises an annular collar and an end opening (EP-A-1 336 572, EP-A-1 425 227, EP-A-1 666 368, WO 2005/021396, WO 2007/122648). These embodiments are specific to their use and provide answers to individual problems that are not those of the biopharmaceutical field. For example, and in a nonlimiting manner, the object of these embodiments is a mass production designed for everyone, and the mounting or assembly is designed to be able to hold up for a significant period (up to several years) or, conversely, the mounting or assembly is disposable and sealing is not a critical factor. These embodiments therefore cannot be transferred to the biopharmaceutical field for mounting or assembling—in a stationary, rigid, removable and airtight manner—pieces such as receptacles, tubes or ports, or parts thereof, with inherent requirements in the field being considered and with the uses in question.

Finally, the documents U.S. Pat. No. 2,690,854 and FR-A-2 379 450 are also known from the state of the art.

The document U.S. Pat. No. 2,690,854 describes a metal barrel that has an open end and a stiffening fold forming a flange that makes it possible to roll the metal barrel when it is full and therefore heavy. The upper end of the barrel is open and has a curved flange that projects toward the exterior of the drum body. A metal cover equipped with a fold on its upper surface is used to reclose the barrel. This cover comprises curved portions forming a flange that extends toward the barrel while maintaining enough play to allow the curved edge of this barrel to pass. The flange forms an annular channel in which an inflatable rubber joint, made of neoprene or a similar material, is used. Latex or polymer solutions can also be used. However, this arrangement does not make it possible to produce adequate sealing for the biopharmaceutical field since the inflation of the inflatable joint tends to open the edge of the cover and, in doing so, to weaken the hold and sealing of the device.

The document FR-A-2 379 450 describes a flexible rubber sheet that has a peripheral edge that is to be connected by a sealed joint against a pressure plate forming a lateral wall straightened by a plate that is arranged on the base of a container and forms part of this base. The base of the container has another lateral wall that is located at a distance from the pressure wall, in such a way that these two walls form between them a groove into which a rigid element, made of metal or plastic, is placed. Over its length, the rigid element has two chambers that each accommodate an inflatable tube that is made of presumed elastic material ensuring a seal. This device is no longer suited to the biopharmaceutical field, in particular because it does not ensure a fixed and rigid, removable and airtight connection of the flexible sheet relative to the pressure plate. On the contrary, the action of the single inflatable joints on the flexible sheet does not make it possible to hold it effectively against the pressure plate.

There therefore exists an unsatisfied need for mounting or assembling—namely sealing or connecting with communication—in a stationary, removable and airtight manner, a first piece and a second piece, such as receptacles, tubes or ports or more precisely parts thereof, used in processes and devices of the biopharmaceutical field with—as inherent requirements—a possibility of single use (per se or for a process overall), a low cost, a quick installation (i.e., mounting or assembly) and disassembly, an airtight mounting or assembly, a possibility of application in the case of biopharmaceutical devices whose openings involved by the connection can reach about fifty centimeters in diameter, and an easy, quick and reliable installation. There is also a need for sets of pieces (a first piece and a second piece) that can be mounted or assembled as indicated and that proceed from a "versatile" idea allowing a great diversity of functions and applications in the biopharmaceutical field. In this field, and in addition to what has already been indicated, it is essential that the materials that are used are such that the components and devices produced from them keep their integrity during sterilization, for example by γ radiation, and that the devices that are used meet the approval of the health authorities and are compatible with a white room use. Furthermore, most often, the sets of pieces considered here (first piece and second piece) are designed, within the framework of standard use, to accommodate fluids at atmospheric pressure or close to atmospheric pressure and at positive temperatures between temperatures that are close to 0° C. up to temperatures on the order of 40° C.

The invention has as its object to meet this need that corresponds to specific requirements of the biopharmaceutical field.

For this purpose, according to a first aspect, the object of the invention is a piece (first piece 1) that is specially designed to be mounted in a stationary and rigid, removable and airtight manner, on a rigid annular collar of a second piece that has one end opening, the first piece, of the XX axis:

Comprising a transverse wall that can come into the opening;

Comprising an annular wall that forms a skirt, having an interior surface that has little or no ability to expand under an external force in the direction of expansion;

Comprising a hollow, toroidal holding chamber, adjacent to the interior surface of the skirt and located toward the interior of the latter, deformable between a retracted state in which it is flattened on itself, and an expanded state in which it is broadened and filled with an inflation medium that is nearly incompressible; at least one entry/exit port of the inflation medium in fluidic communication with the holding chamber and accessible from the exterior of the skirt, able to allow the entry or exit of the inflation medium into or from the toroidal holding chamber; and a valve that is located on the exterior of the skirt;

Of which the dimensions are selected, relative to those of the collar, in such a way as to be able, when the holding chamber is in the retracted state, to be slipped onto or slipped off of the second piece and when the holding chamber is in the expanded state to be mounted in a stationary and rigid and airtight manner on the collar, with the mating part of the internal surface of the holding chamber being in contact with holding tightening on the mating part of the exterior surface of the collar;

characterized by the fact that:

The transverse wall, with inherent sealing, is either continuous and solid or comprises at least one passage opening;

The interior surface of the skirt comprises:

A cylindrical part of larger diameter adjacent to the transverse wall,

A cylindrical part of smaller diameter that is separated axially from the transverse wall, between the axial end parts from which an annular groove is provided, with the toroidal holding chamber being held by, and at least partially housed in, the annular groove, with the skirt carrying the holding chamber, And an intermediate connecting part of tapered shape, adjacent to the part of larger diameter and to the part of smaller diameter;

The interior surface of the skirt has a shape that is complementary with the surface of the collar, except for the annular groove, with the intermediate part coming into contact with holding tightening on the mating part of the surface, the first piece taken as a whole being able to be deformed by bending so that it can be slipped on and slipped off of the second piece;

With the first piece being made of a material that is suited to the biopharmaceutical field, a field for which the first piece is specially designed with quick stationary, rigid and airtight installation and removal, having sealing of the second piece when the transverse wall is continuous and solid, or being connected with communication to the second piece, when the transverse wall comprises a passage opening.

According to one embodiment, the toroidal holding chamber is a piece that is separate from the skirt, connected to it, the annular groove, in a shape that is at least partially complementary with that of the toroidal holding chamber, having an opening that is located in the interior surface of the skirt, with the mating part of the holding chamber being located radially facing the opening of the groove, the at least one entry/exit port passing through the skirt into its part of smaller diameter of its interior surface.

According to one embodiment, the skirt has, on the one hand, the same radial thickness or close radial thicknesses facing the part of larger diameter and facing the part of smaller diameter facing the toroidal holding chamber, and, on the other hand, a larger radial thickness facing its axial end parts of smaller diameter, with the interior diameter of the mating part of the internal surface of the holding chamber in the expanded state being equal or slightly less than the interior diameter of the part of smaller diameter of the skirt radially facing its axial end parts of smaller diameter.

According to one embodiment, the intermediate part of the interior surface of the skirt has a tapered shape, having a tilt on the order of 45° with the XX axis.

According to one embodiment, in the case where the transverse wall comprises a passage opening, the first mounting piece also comprises a tubular piece, delimiting the opening of the transverse wall that is made integral with the transverse wall for forming a rigid unit that extends toward the exterior and/or the interior of the transverse wall. The first piece, equipped with the tubular piece, ensures a function of connection and rigid attachment and passage or transfer, with the tubular piece, extending toward the exterior of the transverse wall, being able to accommodate and to attach—rigidly and in an airtight manner—the annular end part of a third piece.

According to the embodiments, such a tubular piece is rigid or has a certain deformation capacity.

According to one embodiment, such a tubular piece, extending toward the exterior of the transverse wall, comprises a tubular wall for the accommodation and the rigid and airtight attachment of the annular end part of the third piece and, at one end of the tubular wall, a collar for the rigid attachment to the part of the transverse wall that forms the edge of the opening with which it is equipped.

According to one embodiment, the tubular piece comprises—toward the exterior of its tubular wall—an exterior cylindrical wall, providing with this tubular wall an annular cylindrical housing that can accommodate the annular end part of the third piece.

According to one embodiment, the tubular piece comprises, forming a rigid unit with it, a transverse collar, directed toward the exterior, able to constitute a means for suspension of the third piece, working with a support wall that has a hole.

According to one embodiment, in the case where the transverse wall comprises a passage opening, a third piece is provided that has an annular end part, which is able to be, or is, attached directly to the part of the transverse wall that forms the edge of the opening.

According to the embodiments, the third piece has either a form of open pocket or not opposite the annular end part or a form of tube.

According to one embodiment, a closing piece combined with the third piece, if necessary the tubular piece, having as its function to open or to close the passage formed by the annular end part of the third piece, is provided.

According to one embodiment, the mounting piece comprises a first annular peripheral sealing means in the form of a rounded bead in a transverse straight cross-section and is located close to the skirt, with a second mating annular peripheral sealing means in the form of a rounded groove in a transverse straight cross-section being provided on the end edge of the collar.

According to one embodiment, the mounting piece can also comprise at least one external peripheral tab adjacent to the free edge of the skirt and integral with it, able to contribute to the installation and/or the removal of the first piece on and/or from the collar of the second piece.

According to one embodiment, the transverse wall and the skirt are made of silicone or an equivalent material.

According to one embodiment, the holding chamber is made of silicone or an equivalent material if it is inflated with a liquid or butyl or an equivalent material if it is inflated with a gas, in which case the chamber, the butyl is coated toward the exterior with a material that is acceptable in the white room and more generally in the biopharmaceutical field, such as silicone or the equivalent.

According to one embodiment, the constituent materials of the piece are antistatic. According to a second aspect, the object of the invention is a unit, specially designed for the biopharmaceutical field, comprising a first mounting piece as it was just described and a second piece on which it is mounted in a stationary and rigid, removable and airtight manner. The second hollow piece comprises an end opening that is delimited by a rigid annular collar that has, on the side of the opening, a bulge directed toward the exterior, the exterior surface of the collar comprising a part of larger diameter toward the bulge and the opening, a part of smaller diameter separated from the bulge and the opening, and an intermediate part, in such a way that in the active state where the first piece is mounted on the second piece, the mating part of the internal surface of the holding chamber comes into contact with holding tightening and sealing on the mating part of the exterior surface of the collar of the second piece, with the first piece having quick installation and removal on the second piece.

According to one embodiment, the second sealing means, such as an annular groove, is provided on the end edge of the collar that forms the bulge, with which, when it is provided, a first annular peripheral sealing means works in the form of a rounded bead in a straight cross-section that is transverse and located close to the skirt.

According to a first embodiment, the fact that the second piece is a port that is part of a storage or treatment receptacle, also comprising a pocket that has a bottom and, opposite the bottom, an opening that is designed to be combined rigidly, or is combined rigidly, with the second piece opposite its end opening.

According to one embodiment, such a pocket comprises a flexible lateral wall that can be found in two end states, respectively flat-folded and deployed, and in any intermediate state, and can be deformed for switching from one state to another.

According to one embodiment, the receptacle comprises, in an integrated manner, means for treatment of its contents.

According to one embodiment, the second piece that forms a port also constitutes means for protection of the treatment means, whereby their active internal part is essentially arranged in the internal space of the second piece that forms a port when the pocket is in the flat-folded state, whereby the peripheral part of the internal space of the second piece forms a port that forms a chamber for protection of the pocket and treatment means.

According to one embodiment, the treatment means are arranged at least in part in the interior of the pocket by being adjacent to its bottom, opposite the second piece that forms a port.

According to a second embodiment, the second piece is a tube.

According to a first embodiment of the unit, the transverse wall is continuous and solid, with the first piece being for sealing the second piece.

According to a second embodiment of the unit, the transverse wall comprises at least one passage opening, with the first piece being for connection with communication to the second piece.

According to one embodiment, the unit comprises a third piece that comprises an annular end part that is connected in a rigid and airtight manner to the first piece, directly or by means of the tubular piece that was already mentioned.

According to one embodiment, the unit also comprises a closing piece combined with the third piece, if necessary with the tubular piece, having as its function to open or to close the passage that is formed by the annular end part.

According to a third aspect, the object of the invention is a process for mounting or assembly of the first mounting piece at and on the second piece of a unit as it was just described, in which:

A first piece and a second piece that are not mounted or assembled with one another are used, with the holding chamber of the first piece being in the retracted state;

The first piece is positioned opposite and in the axis of the second piece;

The skirt is slipped onto the collar, and the first piece is positioned axially on the second piece;

In this position, the holding chamber of the first piece is switched from the retracted state to the expanded state;

So that, in this situation where the first piece, in the active state, is mounted or assembled on the second piece, the mating part of the internal surface of the holding chamber comes into contact with holding tightening and sealing on the mating part of the exterior surface of the collar of the second piece.

According to a fourth aspect, the object of the invention is a process for disassembly of the first mounting piece from the second piece of a unit as it was just described, in which:

A first piece and a second piece that are mounted or assembled with and on one another are used, with the holding chamber of the first piece being in the expanded state;

The holding chamber of the first piece is switched from the expanded state to the retracted state;

The first piece is slipped off of the second piece, until the two pieces are disassembled.

According to a fifth aspect, the object of the invention is a process for using a unit as described above with a foldable pocket, in which:

A receptacle for storage or treatment is used;

The starting point is a situation in which:

The pocket of the receptacle is in the flat-folded state,

The end opening of the port of the receptacle that forms the second piece is concealed by the first piece arranged toward the top and mounted on and assembled in the second piece, and The pocket is placed by its bottom on the bottom of the container;

With an opening for introducing the product from the receptacle being open, a product is gradually introduced into the receptacle, and simultaneously the pocket is allowed to be deployed upward and to be expanded in volume by the container until the desired quantity of product has been introduced into the receptacle;

The first piece is disassembled from the second piece, and the end opening of the second piece is thus opened;

With this end opening of the second piece thus being opened, a product and/or a means for treatment and/or for measuring the contents of the pocket is introduced through this end opening into the pocket, and once this last stage has ended, The first piece is mounted or assembled on and in the second piece.

In one embodiment corresponding to the case where the receptacle comprises—in an integrated way—treatment means comprising mixing means arranged in the interior of the pocket by being adjacent to its bottom, the process is such that:

The end opening of the port of the receptacle that forms the second piece is concealed by the first piece and with an opening for introducing the product of the receptacle being open, the desired quantity of a product is introduced into the receptacle;

The first piece is disassembled from the second piece, and the end opening of the second piece is thus opened;

With this end opening of the second piece thus being open, a desired quantity of a product is introduced by this end opening into the pocket;

The mixing means are used;

The first piece is mounted or assembled on and in the second piece;

And the implementation of the mixing means is continued.

According to a sixth aspect, the object of the invention is a process for using a unit in the case where the third piece is an open pocket opposite its annular end part for the purpose of inserting a product P into the receptacle via the third piece (open pocket), in which:

A receptacle for storage or treatment comprising a pocket and a third piece (open pocket) connected in a rigid and airtight manner to the first piece is used;

A closing piece is combined with the end part of the third piece (open pocket), and it is maneuvered to close the passage that is formed by the annular end part;

With the third piece (open pocket) being open opposite its thus closed annular end part, the desired quantity of the product P is introduced by this part into this third piece (pocket);

The opening of the third piece (pocket) opposite its closed annular end part is closed;

The first piece is mounted or assembled on and in the second piece, with no communication then existing between the pocket of the receptacle for storage or treatment and the third piece (pocket);

When desired, the closing piece is maneuvered to open the passage that is formed by the annular end part, with communication then being established between the pocket of the receptacle for storage or treatment and the third piece (pocket);

The product that is inserted into the third piece (pocket) is sent into the pocket of the receptacle for storage or treatment.

According to a seventh aspect, the object of the invention is a process for using a unit in the case where the third piece is a closed pocket opposite its annular end part for the purpose of inserting a product P into the receptacle via the third piece (closed pocket), in which:

A receptacle for storage or treatment comprising a pocket and a third piece (closed pocket) connected in a rigid and airtight manner to the first piece is used;

With the third piece (pocket) being open at its annular end part, the desired quantity of the product P is introduced by this part into this third piece (pocket);

A closing piece is combined with the end part of the third piece (pocket), and it is maneuvered for closing the passage that is formed by the annular end part;

The first piece is mounted or assembled on and in the second piece, with no communication then existing between the pocket of the receptacle for storage or treatment and the third piece (pocket) containing the product P;

When desired, the closing piece is maneuvered to open the passage formed by the annular end part, with communication then being established between the pocket of the receptacle for storage or treatment and the third piece (pocket);

The product P that is inserted into the third piece (pocket) is sent into the pocket of the receptacle for storage or treatment.

Several embodiments of the invention are now described using drawings, in which:

FIG. 1 is an axial cutaway view of a possible embodiment of the first piece, in the case of a continuous and solid transverse wall with a sealing bead, with the first piece being at rest, inactive and disassembled from the second piece;

FIG. 2 is an axial cutaway view of the embodiment of the first piece of FIG. 1, mounted on, or assembled in, the second piece in the form of a port that is part of a receptacle that also comprises a pocket that is shown symbolically and partially, with the holding chamber of the first active piece coming into contact with holding tightening on the exterior surface of the collar of the second piece;

FIG. 3 is an axial cutaway view of another possible embodiment of the first piece, in the case of a continuous and solid transverse wall without a sealing bead, with the first piece being at rest, inactive and disassembled from the second piece;

FIG. 4 is an axial cutaway view of the embodiment of the first piece of FIG. 3, mounted on, or assembled in, the second piece in the form of a port that is part of a receptacle that also comprises a pocket shown symbolically and partially, with the holding chamber of the first active piece coming into contact with holding tightening on the exterior surface of the collar of the second piece;

Figure 13:
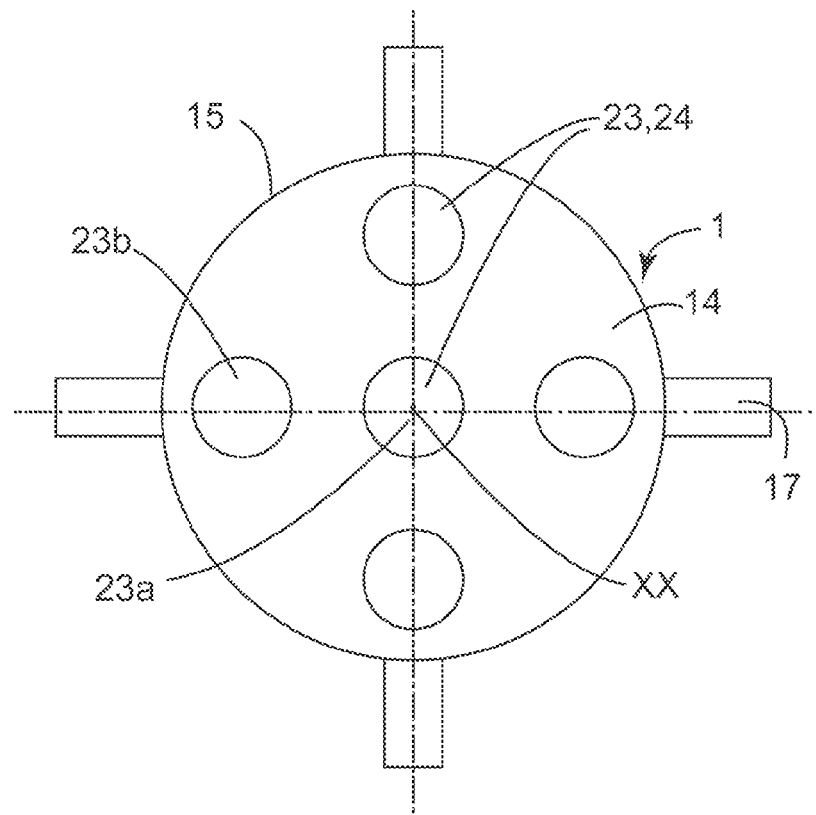
Figure 24A:
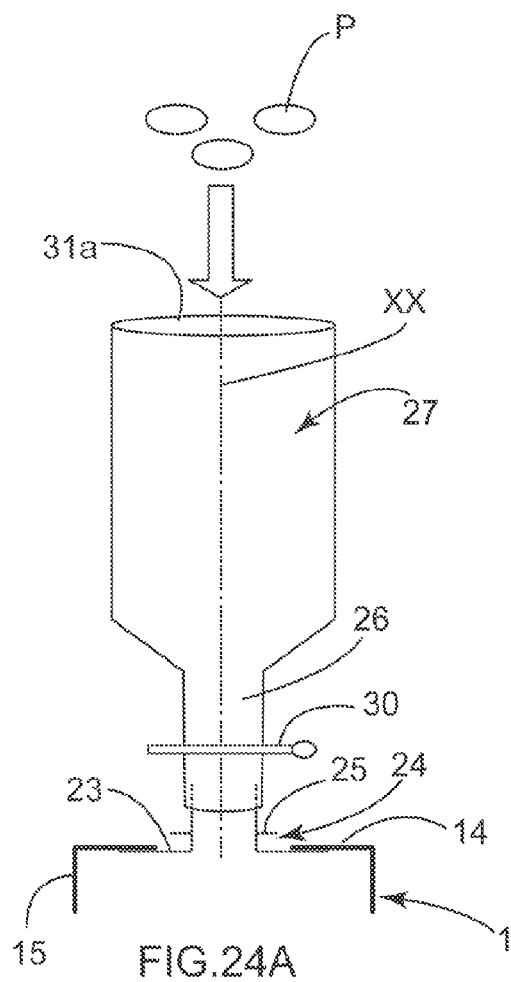
Figure 24B:
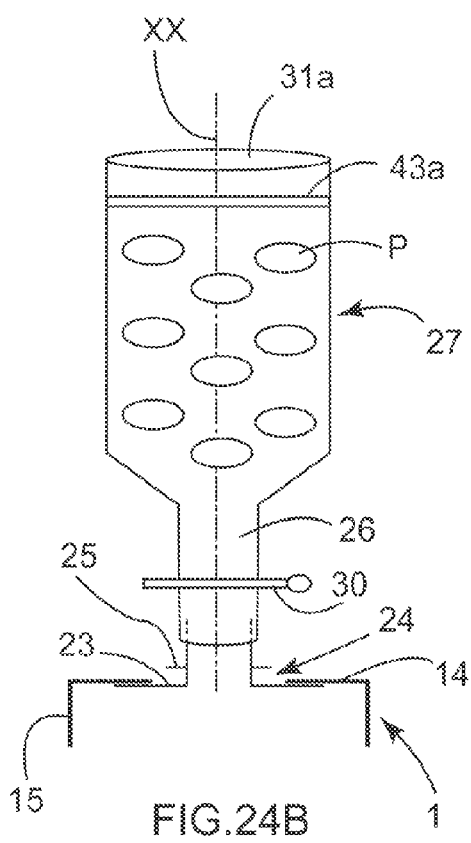
Figure 26A:
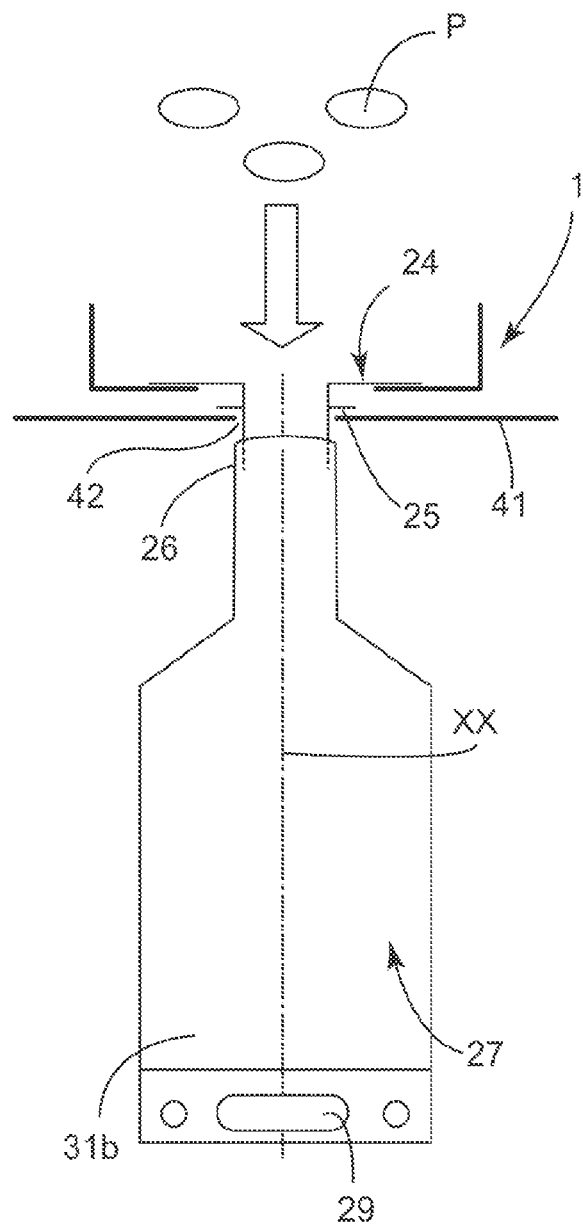
Figure 26B:
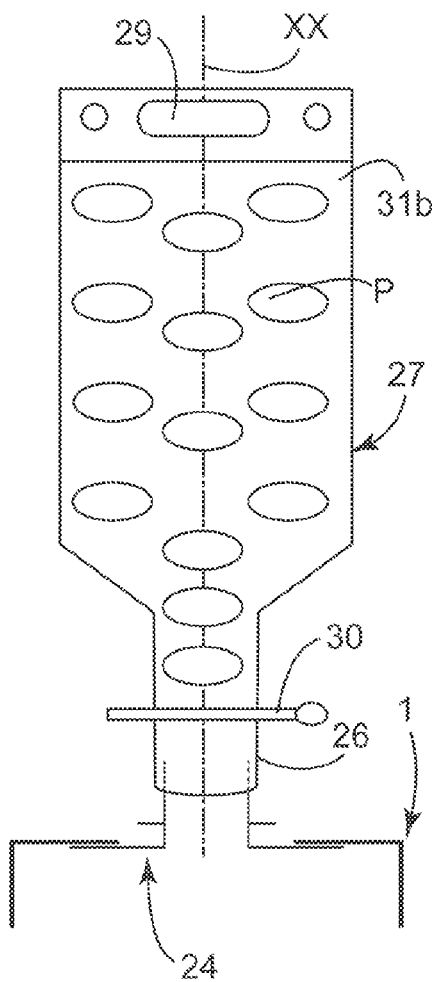
Figure 27:
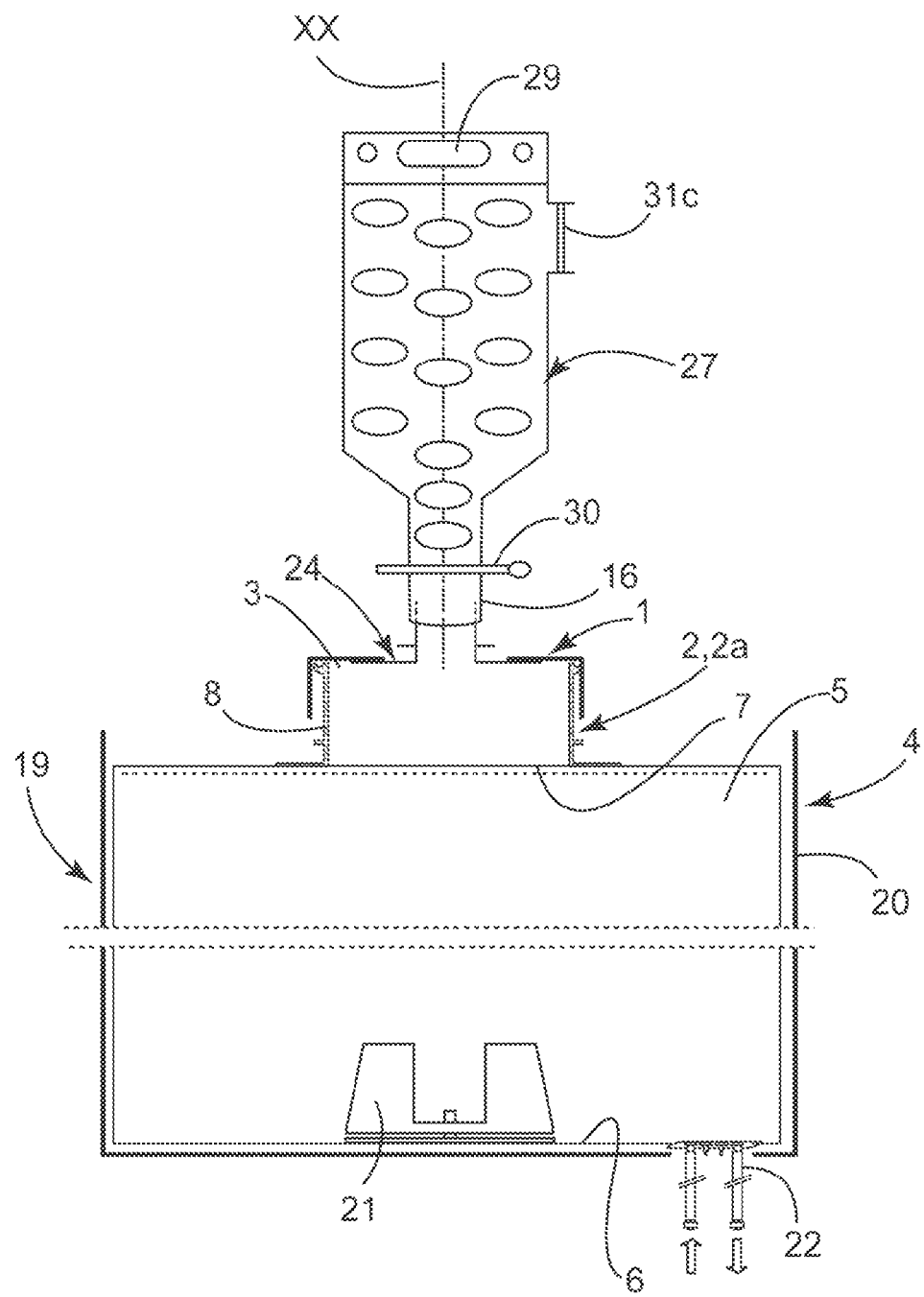

FIG. 7, analogous to FIG. 1, is an axial cutaway view of another possible embodiment of the first piece, in the case of a transverse wall with a sealing bead and comprising several passage openings delimited by several tubular pieces, in this case one extending toward the interior and several extending toward the exterior, with the first piece being at rest, inactive and disassembled from the second piece;

FIG. 8, analogous to FIG. 2, is an axial cutaway view of the embodiment of the first piece of FIG. 7, mounted on, or assembled in, the second piece in the form of a port that is part of a receptacle that also comprises a pocket shown symbolically and partially, with the holding chamber of the first active piece coming into contact with holding tightening on the exterior surface of the collar of the second piece;

FIG. 9 is an axial cutaway view of another possible embodiment of a first piece, in the case of a transverse wall without a sealing bead and comprising several passage openings delimited by several tubular pieces, in this case one extending toward the exterior and several extending toward the exterior; with the first piece being at rest, inactive and disassembled from the second piece;

FIG. 10 is an axial cutaway view of the embodiment of the first piece of FIG. 9, mounted on, or assembled in, the second piece in the form of a port that is part of a receptacle that also comprises a pocket shown symbolically and partially, with the holding chamber of the first active piece coming into contact with holding tightening on the exterior surface of the collar of the second piece;

FIG. 11 is a view that is analogous to FIG. 8 (first piece with a sealing bead), in the case of a second piece in tube form, with the holding chamber of the first active piece coming into contact with holding tightening on the exterior surface of the collar of the second piece;

FIG. 12 is a view that is analogous to FIG. 10 (first piece without a sealing bead), in the case of a second piece in tube form, with the holding chamber of the first active piece coming into contact with holding tightening on the exterior surface of the collar of the second piece;

FIG. 13 is a top elevation view of the first piece according to an embodiment of the type that is shown in FIGS. 7 and 9, with the first piece being at rest, inactive and disassembled from the second piece;

FIGS. 14A and 14B are two explanatory diagrams, in axial cutaway and on a larger scale, illustrating the first piece according to the variant embodiment with a sealing bead according to FIGS. 1, 2, 5, 7, 8 and 11, respectively before and after mounting on, or assembly in, the second piece; whereby the first piece is at rest, inactive and disassembled from the second piece in FIG. 14A and the skirt of the first active piece, coming into contact with holding tightening on the exterior surface of the collar of the second piece in FIG. 14B;

FIGS. 15A and 15B are two explanatory diagrams, in axial cutaway and on a larger scale, illustrating the first piece according to the variant embodiment without a sealing bead according to FIGS. 3, 4, 6, 9, 10, and 12, respectively before and after mounting on, or assembly in, the second piece, whereby the first piece is at rest, inactive and disassembled from the second piece in FIG. 15A, and with the holding chamber of the first active piece coming into contact with holding tightening on the exterior surface of the collar of the second piece in FIG. 15B;

FIG. 16 is a diagrammatic view in axial cutaway of a unit that comprises a first piece according to the variant embodiment with a sealing bead according to FIGS. 1, 2, 5, 7, 8 and 11, and a second piece that is a port that is part of a receptacle that also comprises a pocket that is placed in an external rigid container, whereby the first piece is disassembled from the second piece but opposite the opening of the collar of the second piece;

FIG. 17 is a series of nine successive diagrams, 17A to 17I, illustrating the successive stages of a mixing process that uses a first piece with a continuous and solid transverse wall;

FIGS. 18A and 18B are two half-views in axial cutaway of a unit that comprises a third piece that is made integral directly with the first piece whose transverse wall comprises an opening, with the third piece being in the form of an open pocket (half-view from the left or FIG. 18A) or in the form of a closed pocket (half-view from the right or FIG. 18B), whereby the first piece is shown here in a purely symbolic way;

FIGS. 19A and 19B are two half-views in axial cutaway of a unit that comprises a third piece that is made integral directly with the first piece whose transverse wall comprises an opening, with the third piece being in the form of an open tube (half-view from the left or FIG. 19A) or in the form of a closed tube (half-view from the right or FIG. 19B), whereby the first piece is shown here in a purely symbolic way;

FIGS. 20A and 20B are two half-views that are analogous to FIGS. 18A and 18B, with the unit comprising a third piece that is made integral indirectly with the first piece whose transverse wall comprises an opening by means of a tubular piece, with the third piece being in the form of an open pocket (half-view from the left or FIG. 20A) or in the form of a closed pocket (half-view from the right or FIG. 20B), with the first piece being shown here in a purely symbolic way;

FIGS. 21A and 21B are two half-views in axial cutaway of a unit that comprises a third piece that is made integral indirectly with the first piece whose transverse wall comprises an opening, by means of a tubular piece, whereby the third piece is in the form of an open tube (half-view from the left or FIG. 21A) or in the form of a closed tube (half-view from the right or FIG. 21B), whereby the first piece is shown here in a purely symbolic way;

FIGS. 22A, 22B, 23A and 23B are analogous to the respective FIGS. 20A, 20B, 21A and 21B, with the tubular piece having another embodiment, and the first piece being shown here in a purely symbolic way;

FIGS. 24A and 24B are two axial cutaway views that illustrate two successive stages of a process for the filling with a product of a unit that comprises a third piece in the form of an axially open pocket, indirectly made integral with the first piece whose transverse wall comprises an opening by means of a tubular piece such as the one shown in FIGS. 20A and 20B, with the first piece being shown here in a purely symbolic way;

FIGS. 25A and 25B are two views that are analogous to FIGS. 24A and 24B, in the case of a third piece in the form of a pocket that is open laterally, with the first piece being shown here in a purely symbolic way;

FIGS. 26A and 26B are two axial cutaway views that illustrate two successive stages of a process for the filling with a product of a unit that comprises a third piece in the form of a closed pocket, made integral indirectly with the first piece whose transverse wall comprises an opening by means of a tubular piece such as the one shown in FIGS. 20A and 20B, with the first piece being shown here in a purely symbolic way;

FIG. 27 is a schematic axial cutaway view of a unit that comprises a first piece according to the variant embodiment without a sealing bead according to FIGS. 3, 4, 6, 9, 10 and 12, 15A and 15B and a second piece that is a port that is part of a receptacle that also comprises a pocket that is placed in an external rigid container, with the first piece being mounted on and assembled in the second piece, the unit also comprising a third piece in the form of a pocket that is opened laterally and made integral indirectly with the first piece whose transverse wall comprises an opening by means of a tubular piece such as the one that is shown in FIGS. 25A and 25B.

Reference is now made to FIGS. 1 and 2 that show a first piece 1 for mounting or assembly and, in this case, sealing, mounted or assembled in a stationary, removable and airtight manner on a second rigid, hollow piece 2 for storage or for passage, with a quick installation and removal.

The two pieces 1 and 2, the unit 1+2 formed by the two mounted and assembled pieces, and the associated processes and devices are specially designed for the biopharmaceutical field. This means that they are designed to meet all of the requirements and to satisfy all of the constraints that are specific to this technical field.

Now, more specially, the second piece 2 is described.

In the embodiment that is being considered here, the second piece 2 is a port 2a that has an end opening 3 and is part of a receptacle 4 for storage or treatment (FIG. 16), also comprising a pocket 5 that has a bottom 6 and, opposite the bottom 6, an opening 7 that is designed to be combined rigidly, or is combined rigidly, with the second piece 2 opposite its end opening 3.

The second piece 2 has an XX axis and comprises an annular collar 8 that delimits the end opening 3.

The second piece 2 is rigid with a degree such that it can absorb the tightening forces exerted on it by the first piece 1, as described below.

The end opening 3 can have a more or less large diameter or, on the contrary, a small diameter based on the applications. In the case of large-capacity receptacles 4, for example 3,000 liters, intended for mixing, it may be important that the end opening 3 have a large enough diameter, for example that can reach on the order of 50 centimeters. The piece 1 is adapted to this case depicted, just as to that of very small diameters.

From the side of the opening 3, the collar 8 forms a bulge 9 that is directed radially toward the exterior.

The exterior surface 10 of the collar 8 comprises a cylindrical part 10a of larger diameter toward the bulge 9 and the opening 3, a cylindrical part 10b of smaller diameter separated from the bulge 9 and the opening 3, and an intermediate part 10c for connection of a tapered shape whose large base is adjacent to the part 10a with a larger diameter and whose small base is adjacent to the part 10b of smaller diameter. In this case, the tilt of the intermediate part 10c with a tapered shape is on the order of 45° on the XX axis.

The end edge 11 of the bulge 9 of the collar 8 comprises, in the embodiment being considered, a second peripheral and annular sealing means 12 that has, in a transverse straight cross-section, a shape of a rounded groove, for example at least essentially semi-circular.

Opposite the bulge 9 and the opening 3, in the axial direction, the second piece 2 comprises, being an integral part, an annular plate 13 that is arranged radially toward the exterior, rigidly attached to the pocket 5, in the vicinity of its opening 7.

The second piece 2 has a cylindrical shape of an XX axis, with a transverse cross-section that is circular or of another shape. It is made of plastic material or of any other equivalent material that is compatible with use in the biopharmaceutical field.

The first piece 1 is now described more specially in the embodiment being considered here.

The first piece 1 has an XX axis that, when the two pieces 1 and 2 are mounted on one another or assembled in one another, is merged with the XX axis of the second pipe 2, whereby the two pieces 1 and 2 are mounted and assembled coaxially.

The first piece 1 comprises a transverse wall 14, having an exterior surface and an interior surface 14a. In the embodiment being considered, the transverse wall 14 is continuous and solid, with the first piece 1 having a sealing function once mounted on, and assembled in, the second piece 2.

As is readily visible in the figures, the interior surface 14a of the transverse wall 14 is formed by an essentially flat central zone and a marginal zone positioned on the periphery of the central zone so as to form a mating part of the end edge 11 of the collar 3 that can be applied against it and to participate in the sealing between the two pieces 1, 2.

According to this embodiment, there is an essentially flat continuity between the central and marginal zones of the transverse wall 14. More particularly, these central and marginal zones extend essentially along the same plane.

Furthermore, no part of the transverse wall 14 comes on the internal surface of the collar 8.

Thus, when the first piece 1, mounted in a stationary and rigid manner on the second piece 2, is to be removed, it is possible to slightly stretch the transverse wall 14 of this first piece 1 without any portion abutting against the interior surface of the collar 8. In this case depicted, the central zone of the transverse wall 14 can be stretched transversely and can slide over the end edge 11 of the collar 8 until the first piece 1 is in a state where it may be totally removed.

In the same way, when the first piece 1 is in an inactive state and it is to be mounted in a stationary and rigid manner on the second piece 2, it is possible to slightly stretch the transverse wall 14 of this first piece 1 and to position the first piece 1 on the end edge 11 of the collar 8. Using the essentially flat continuity that links the central and marginal zones of the transverse wall 14, the latter can rest on the end edge 11 of the collar 8 and can slide over it without any portion disturbing this sliding. The marginal zone of the transverse wall 14 then forms a part that is mated to this end edge 11.

The first piece 1 also comprises a peripheral annular wall that forms a skirt 15, having an exterior surface 57 and an interior surface 15a.

The transverse wall 14 and the skirt 15 are in one piece, for example manufactured as a unit. As a variant, there are two separate pieces that are assembled rigidly to one another.

As indicated, the transverse wall 14 has as its function, when the two pieces 1 and 2 are mounted and assembled, to come into the opening 3 so as to conceal it.

The skirt 15 has as its function, in any situation or state, to carry a holding chamber 45, and, when the two pieces 1 and 2 are mounted and assembled, with the holding chamber 45 then being in the expanded state and its internal surface 47 in contact with the exterior surface 10 of the collar 8, it has as its function to contain the expanded holding chamber 45 radially toward the exterior, with the holding tightening being absorbed by the adequate rigidity of the second piece 2. The parts of the surfaces 10, 10b, on the one hand, and 47, 47a, on the other hand, in contact with one another with holding tightening, are described as "mated."

The two pieces 1, 2 have complementary shapes that allow their mounting and assembly. In particular, the interior surface 15a of the skirt 15 has a shape that is complementary to the surface 10 of the collar, except for a groove 48 that is made on the interior surface 15a of the skirt 15.

The interior surface 15a of the skirt 15 consequently comprises a part of cylindrical shape 39a of larger diameter and adjacent to the transverse wall 14, a part of cylindrical shape 39b of smaller diameter that is axially separated from the transverse wall 14 where the groove 48 is located, and an intermediate connecting part 39c of tapered shape whose large base is adjacent to the part 39a of larger diameter and whose small base is adjacent to the part 39b of smaller diameter. The tilt of the intermediate part 39c of tapered shape is on the order of 45° on the XX axis.

Once the two pieces 1 and 2 are mounted and assembled, the part 39a of the skirt works with the part 10a of the exterior surface 10 of the collar 8, whereby these two parts 39a and 10a can be described as mated, while the part 39b works with the part 10b, with these two parts 39b and 10b being able to be described as mated, and the part 39c comes into contact with holding tightening and is mated to the part 10c.

As it was indicated, the first piece 1 also comprises the toroidal holding chamber 45, integrated with the piece by being connected to the skirt 15.

The toroidal holding chamber 45 is hollow and adjacent to the interior surface 15a of the skirt 15 by being located toward the interior of the latter.

The toroidal holding chamber 45 can be deformed between a retracted state in which it is flattened on itself (FIGS. 14A and 15A) and an expanded state in which it is broadened and filled with an inflation medium that is nearly incompressible (FIGS. 14B and 15B).

The toroidal holding chamber 45 is connected to the skirt 15 and held by—and at least partially housed in—the annular groove 48 of the skirt 15.

In the transverse straight cross-section, the groove 48 has a shape that is at least partially complementary to that of the toroidal holding chamber 45. It is made in the part 39b of smaller diameter of the interior surface 15a of the skirt 15 between its two axial end parts 49—toward the transverse wall 14—and 50—separated from the transverse wall 14—of smaller diameter.

In this case, in the transverse straight cross-section, the groove 48 has a shape of—or close to that of—a rectangular trapezoid whose large base is the opening 51 of the groove 48 and is located in the interior surface 15a of the skirt 15.

The small base 54 of the groove 48 forms its bottom and is located opposite the opening 51.

The small orthogonal side 55 of the groove 48 is located toward the axial end part 49 of the interior surface 15a of the skirt 15 that forms a type of projection directed toward the XX axis.

The large tilted side 56 of the groove 48 is located toward the axial end part 50 of the interior surface 15a of the skirt 15 that forms a type of projection directed toward the XX axis and at the same time is tilted.

The mating part 47a of the holding chamber 45 being located radially facing the opening 51 of the groove 48 that it fills.

The first piece 1 also comprises at least one entry/exit port 46 of an inflation medium of the holding chamber 45 to bring it into the expanded state.

Such an entry/exit port 46 is in fluidic communication with the holding chamber 45, and it is accessible from the exterior of the skirt 15.

This entry/exit port 46 can allow the entry or exit of the inflation medium into the toroidal holding chamber 45.

The entry/exit port 46 passes through the skirt 15 into its part 39b of smaller diameter from its interior surface 15a. It comprises a valve 52 on the exterior of the skirt 15.

First, the valve 52 can work in fluidic communication with an injection end fitting 53 of the inflation medium combined with intake means of the inflation medium for allowing the injection of the inflation medium into the holding chamber 45 and the switching of the latter from the retracted state to the expanded state and therefore the holding of the first piece 1 that is assembled in and on the second piece 2.

Second, the valve 52 can be sealed to allow the preservation of the holding chamber 45 in the expanded state and therefore the preservation of the holding of the first piece 1 that is assembled in and on the second piece 2.

Third, the valve 52 can be open to allow the discharge of the inflation medium from the holding chamber 45 and the switching of the latter from the expanded state to the retracted state and therefore the slipping onto or the slipping off of the first piece 1 relative to the second piece 2.

The dimensions of the first piece 1 and its constituent parts are selected in relation to those of the collar 8 of the second piece 2.

More specifically, the dimensions are selected in such a way that when the holding chamber 45 is in the retracted state, the first piece 1 can be slipped onto or slipped off of the second piece 2, if necessary by means of a certain bending provided manually with force to the first piece 1 by the operator.

In contrast, the dimensions are selected in such a way that when the holding chamber 45 is in the expanded state, the first piece 1 can be, or is, mounted in a stationary and rigid and airtight manner on the collar 8 of the second piece 2, with the mating part 47a of the internal surface 47 of the holding chamber 45 then being in contact with holding tightening and sealing on the mating part 10b of the exterior surface 10 of the collar 8.

The skirt 15 has the same radial thickness or close radial thicknesses facing the part 39a of larger diameter and facing the part 39b of smaller diameter facing the cavity 48 and the toroidal holding chamber 45. It has, in contrast, a larger radial thickness facing its axial end parts 49, 50 of smaller diameter.

Thus, the exterior surface 57 of the skirt 15 can have a general cylindrical shape of constant diameter or small variation, radially facing the parts 39a, 39b and 39c.

For its part, the interior diameter of the mating part 47a of the internal surface 47 of the holding chamber 45 in the expanded state is equal to or slightly less than the interior diameter of the part 39b of smaller diameter of the skirt 15 radially facing its axial end parts 49, 50 of smaller diameter. Consequently, in the expanded state, the mating part 47a of the internal surface 47 of the holding chamber 45 is coplanar or slightly projecting relative to the axial end parts 49, 50 of the skirt 15.

The transverse wall 14 and the skirt 15 are made of a material that offers an inherent sealing, apart from the fact that the first piece 1 is mounted and assembled on the second piece 2 also with sealing between them. Sealing is defined here as that required for a biopharmaceutical application that relates to air, water and in particular a barrier to bacteria.

Except for the holding chamber 45, the first piece 1 taken as a whole can, by an adequate and suitable manual action of the operator, be deformed by bending for its slipping onto and slipping off of the second piece 2.

The skirt 15 has no—or only a slight—capacity for expansion under an external force in the direction of expansion in such a way as to perform its function of radially containing the expanded holding chambers 45 toward the exterior. This characteristic does not prevent the skirt 15 from being deformed by the slipping on or slipping off of the first piece 1.

The first piece 1 can be found in two typical states or situations:
- An at-rest state, where the first piece 1 is inactive, disassembled from the second piece 2, with the holding chamber 45 being in the retracted state, as shown in FIGS. 1 and 14A;
- An active state, where the first piece 1 is mounted on, or assembled in, the second piece 2, with the holding chamber 45 of the first piece 1 coming into contact with holding tightening on the exterior surface 10 of the collar 8 of the second piece 2, as shown in FIGS. 2 and 14B.

The interior surface 15a of the skirt 15, in the inactive state at rest, has a diameter that is approximately equal to the exterior diameter of the exterior surface 10 of the collar 8 (see FIGS. 14A and 14B).

On its interior surface 14a, the transverse wall 14 comprises a first sealing means 16 that is peripheral and annular, projecting, located close to the skirt 15 and having a rounded bead shape, for example at least essentially semi-circular, in a transverse straight cross-section.

The two sealing means 12 and 16 are mated and designed to be combined with one another and thus to work with one another when the two pieces 1 and 2 are mounted or assembled.

Starting from the rest state of the first piece 1 (FIG. 14A), the first piece 1 and whereas the holding chamber 45 is in the retracted state, the skirt 15 of the first piece 1 can be slipped on to the collar 8 of the second piece 2. If necessary, the first piece 1 is bent during this maneuver.

Then, the inflation medium is injected into the holding chamber 45, using the port 46, in particular its valve 52, and the injection end fitting 53.

Taking into account the relative dimensions of the first piece 1 relative to the second piece 2, in particular its collar 8, it is possible, when the holding chamber 45 is in the retracted state, to slip the first piece 1 onto the second piece 2. And it is possible, when the holding chamber 45 is in the expanded state, that the first piece 1 is mounted in a stationary and rigid and airtight manner on the collar 8 of the second piece 2, with the mating part 47a of the internal surface 47 of the holding chamber 45 being in contact with holding tightening and sealing on the mating part 10b of the exterior surface 10 of the collar 8, while the parts 39a, 49, 50 and 39c of the skirt 15 work with the corresponding parts 10a, 10b and 10c of the collar 8 of the second piece 2.

By a reverse maneuver, the first piece 1 can then, conversely, be removed and disassembled from the collar 8.

It should be noted that the installation of the first piece 1 on the second piece 2 is easy, quick and reliable. The same is true for the removal or disassembly of the first piece 1 from the second piece 2. The mounting or assembly is therefore also removable and, taking the preceding into account, well suited to the case where the process that is used requires several operations for opening and closing, in particular for relatively limited periods.

Once the first piece 1 has been mounted or assembled on the second piece 2, the sealing bead 16 of the transverse wall 14 is combined with sealing by being housed in the sealing groove 12 that is mated with the collar 8 (FIG. 14B).

In this situation, the holding chamber 45 of the first piece 1 exerts on the collar 8 a tightening force that can ensure a stationary and rigid, as well as airtight, holding, with the second piece 2 preventing the inadvertent disassembly of the two pieces 1, 2, except by emptying the holding chamber 45 of its inflation medium to bring it into the retracted state.

In the application being considered, namely the biopharmaceutical field, such a first piece 1 can ensure a mounting or assembly on the second piece 2 for the purposes of sealing the end opening 3, with the holding of this sealing. It is understood that in this application, the receptacle 4 that comprises the pocket 5 is designed to accommodate a fluid at atmospheric pressure or close to atmospheric pressure, and at a positive temperature between temperatures that are close to 0° C. up to temperatures on the order of 40° C. This receptacle 4 is also designed to remain stable, with the pieces 1 and 2 being arranged upward. Consequently, the fluid that is contained in the receptacle 4 cannot itself exert on the first piece 1 an external stress that would be adequate for entraining its disassembly.

In one possible embodiment, not excluding others, the first piece 1 also comprises one or more peripheral tabs 17 that are arranged radially toward the outside, adjacent to the free edge 18 of the skirt 15, adjacent to the part 39b, and integral with it. This or these tabs 17 are such that they can facilitate the manipulation of the first piece 1 for the purpose of its mounting or assembly.

To obtain the performances previously indicated, the transverse wall 14 and the skirt 15 are made of silicone or an equivalent material, particularly well suited to the biopharmaceutical field, in particular keeping its integrity during sterilization by γ radiation, meeting the approval of the health authorities and being able to be used in a white room.

For example, in one embodiment, a silicone of Shore hardness 55 ShA is used. For its part, the holding chamber 45 is made of silicone or an equivalent material if it is inflated with a liquid or butyl or an equivalent material if it is inflated with a gas, in which case the butyl is coated toward the exterior with a material that is acceptable in the white room and more generally in the biopharmaceutical field, such as silicone or the equivalent.

Preferably, the materials that constitute the first piece 1 are antistatic so as not to hamper the implementation of the unit comprising the two pieces 1, 2 in the case where they are in contact with materials in powder form.

In contrast, the constituent materials of the chamber 45 of the first piece 1 and the second piece 2 as well as the state of surfaces of their mating surfaces are such—or are selected in such a manner—that their reciprocal contact is made with a high friction that contributes to the holding of the mounting or assembly of the two pieces 1 and 2 once implemented.

As a result of its composition, such a first piece 1 can be relatively inexpensive to manufacture, which offers a possibility of single use (per se or for a process overall).

In one possible embodiment, the transverse wall 14 has a thickness on the order of one millimeter, while the skirt 15 has a thickness that can be on the order of six millimeters.

To assemble such a first piece 1 in and on such a second piece 2, the procedure is as follows, as well as that which results from FIGS. 14A and 14B.

The starting point is a situation (FIG. 14A) where use is made of a first piece 1 at rest, with the holding chamber 45 in the retracted state, whose shape and dimensions are adapted to those of a second piece 2 to be sealed, which is also used.

The first piece 1 is positioned opposite and in the XX axis of the second piece 2, and, with the chamber 45 being in the retracted state, it is then possible to slip the skirt 15 onto the collar 8 of the second piece 2 until the bead 16 is housed in the groove 12, in such a way that the two pieces 1 and 2 are perfectly positioned axially, if necessary with a given bending to the first piece.

In this position, the holding chamber 45 is switched from the retracted state to the expanded state (FIG. 14B), with the holding thus being ensured as described above.

For the disassembly of the first piece 1 from the second piece 2, the reverse operations are initiated, as already indicated.

FIGS. 3 and 4 show another embodiment, analogous to the preceding one, except that the first piece 1 is lacking a bead forming the first sealing means provided in the preceding embodiment.

FIGS. 15A and 15B, analogous to FIGS. 14A and 14B, illustrate the mounting or assembly in this the corresponding embodiment.

Figure 5:
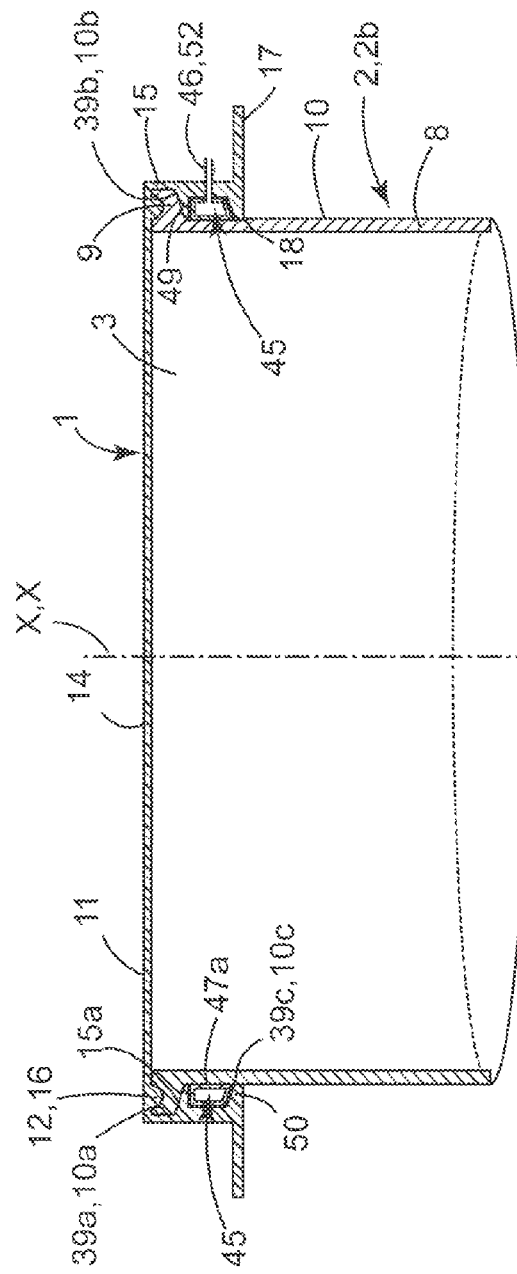
FIG. 5 is an axial cutaway view of a possible embodiment of a first piece that is analogous to that of FIGS. 1 and 2, with the second piece being in tube form.

FIG. 5 shows another embodiment, identical to FIGS. 1 and 2, relative to the first piece 1, while the second piece 2 is not a port as above but a tube 2b whose diameter can be more or less small, or, in contrast, large. Such a tube 2b can have an overall rigidity that can absorb the tightening forces exerted by the first piece 1. If necessary, the rigidity of the tube 2b is such that the latter can be bent with force, if necessary, by an adequate external stress.

Such a tube 2b also comprises a collar 8 that is formed by its end part, whereby this collar 8 has the same structure and the same function as for the port 2a.

Figure 6:
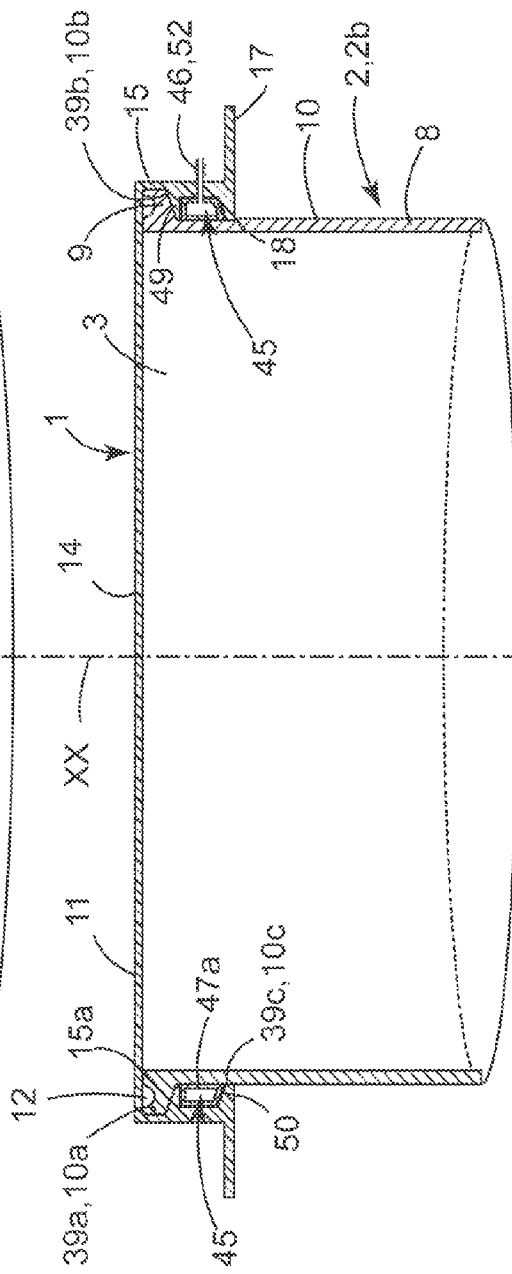
FIG. 6 is an axial cutaway view of a possible embodiment of a first piece that is analogous to that of FIGS. 3 and 4, with the second piece being in tube form.

FIG. 6 shows another embodiment, identical to FIGS. 3 and 4 relative to the first piece 1, while the second piece 2 is no longer a port, but a tube as in the case of FIG. 5.

Thus, the invention can be the object of numerous different applications. The first piece 1 and the unit 1+2 that comprises the first piece 1 and the second piece 2 have a production cost that allows a single use. The mounting or assembly and the disassembly of the two pieces 1 and 2 is quick and reliable. It ensures a sealing that is comparable to that obtained today with the tri-clamps. The openings 3 and 7 can have a diameter that is between a centimeter or a fraction of a centimeter and about 50 centimeters, without the design of the pieces having to be completely distorted.

As for the "versatility," it can be illustrated with reference to the different variant embodiments already described and those that follow.

In the preceding embodiments, and as shown in FIG. 16, the second piece 2, in this case a port 2a, is part of a receptacle 4 that comprises a pocket 5 that is designed to rest with its bottom 6 in the bottom of a rigid exterior holding container 19 open toward the top. Such a pocket 5 comprises a flexible lateral wall 20, with gussets, that can be found in two end states, respectively flat-folded and deployed, and in any intermediate state, and that can be deformed for switching from one state to the next. This constructive arrangement makes it possible for the so-called 3D pocket 5 to have large dimensions and to have a large volume that can reach 3,000 liters.

In the embodiment shown, the receptacle 4 also comprises, integrated with the pocket 5, means 21 for treatment of its contents.

"Treatment" is defined as any action on a biopharmaceutical product or relative to this product and involving a contact with the product, whereby this product is found, of course, in the pocket 5.

In the particular embodiment that is described below, such a treatment is the mixing, with the means 21 being mixing means.

In other embodiments, the treatment is aeration, filtration, or measurement, whereby this list is not limiting.

In all of the cases, treatment means 21 adapted to the desired action are implemented.

For example, the means 21 comprise an internal active part, rigid overall and, as appropriate, deformable or not, such as a propeller in the case of mixing, an aerator in the case of aeration, a filter in the case of filtration, or a sensor in the case of measuring, whereby this list is in no way limiting.

In all cases, the treatment means 21 are arranged at least partly in the interior of the pocket 5 by being adjacent to its bottom 6. They are therefore located opposite the second piece 2 or port 2a.

With such an embodiment, the second piece 2 or port 2a can also constitute means for protecting treatment means 21 of which an active internal part is essentially arranged in the internal space of the second piece 2 or port 2a, when the pocket 5 is in the flat-folded state. The peripheral part of the internal space of the second piece 2 or port 2a then forms a chamber for protection of the pocket 5 and treatment means 21.

Such a unit 1+2 can be implemented as it is now described with reference to the nine diagrams of FIGS. 17A to 17I, together forming FIG. 17.

The starting point is a situation wherein use is made of a receptacle 4 that comprises a pocket 5 in the flat-folded state and a rigid container 19.

In the embodiment shown, the pocket 5, at this stage of advancement of the process, is already equipped in the interior with treatment means 21, here, for example, mixing means 21.

In this situation, the end opening 3 of the port 2a is concealed by the first piece 1 that is arranged toward the top and mounted on and assembled in the port 2a, as it was described above.

The pocket 5 is then placed by its bottom 6 on the bottom of the rigid container 19 (FIG. 17A).

FIG. 17B illustrates the rigid container 19 that contains the pocket 5, with the latter not being visible, because it is concealed by the vertical lateral walls of the container 19.

The following diagrams, FIGS. 17C to 17I, show only the pocket 5 on a larger scale. It is understood that this pocket continues to be in the rigid container 19, not shown here so as not to conceal the pocket 5. In addition, the completely deployed pocket 5 is shown from the beginning of the process, for reasons of ease of reading the figures. It is to be understood, however, that the pocket 5 is deployed upward as it is filled.

The pocket 5 comprises one—or more—openings 22 for introducing product, located in particular at the site or in the vicinity of the bottom 6, accessible from the exterior of the container 19.

As shown in FIG. 17C, with the opening 22 being open, a fluid product, in this case liquid or more or less pasty, is gradually introduced into the pocket 5 of the receptacle 4, and simultaneously the pocket is allowed to deploy upward and to be expanded in volume by the container 19 that guides its lateral walls 20.

The introduction of product is continued until the desired quantity of this product has been introduced into the pocket 5.

Thus far, the first piece 1 and the port 2a were mounted or assembled, with the opening 3 being thereby concealed.

As shown in FIG. 17D, the first piece 1 is then disassembled from the port 2a, as it was described above, and thus the end opening 3 of the port 2a is opened.

As shown in FIGS. 17E, 17F and 17G, with the end opening 3 thus being opened, a desired quantity of another product, in particular in powder form, is introduced via this end opening into the pocket 5. This introduction will be described below.

As shown in FIG. 17H, once this last introduction stage is ended, the previously disassembled first piece 1 (or an identical piece 1) is mounted or assembled again on and in the port 2a, as it was described above, and the opening 3 is concealed again.

The mixing means 21 are implemented, or they are continued to be implemented, if the latter began during the introduction of the product in powder form.

In the embodiments of FIGS. 9 to 13, the transverse wall 14 comprises at least one passage opening 23. In this case, five openings 23 are provided, namely a central opening 23a and four lateral openings 23b that are located on two perpendicular axes. Other arrangements can be considered, since they comprise at least one opening 23.

In these embodiments, with the transverse wall 14 comprising at least one passage opening 23, the first piece 1 has a function of connection with communication, once mounted on, and assembled in, the second piece 2.

FIG. 9 shows an embodiment of the first piece 1 in which the latter is lacking the bead forming the sealing means as it was described above, with this first piece 1 being at rest without external stress.

FIG. 10 shows an embodiment in which such a first piece 1 is mounted or assembled on a port 2a, as it was described above.

FIG. 11 shows another embodiment in which a first piece 1 with a bead forming a sealing means as it was described above is mounted or assembled not on a port but on a tube.

FIG. 12 shows another embodiment in which a first piece 1 that is lacking a bead forming a sealing means as it was described above is mounted or assembled on such a tube.

With the embodiments of FIGS. 9 to 13, it is possible to make use of the first piece 1, of which the transverse wall 14 comprises an opening 23 for—once mounted on and assembled in—the second piece 2, to ensure a function of connection with communication between the second hollow piece 2 and a third hollow piece 27 that is at least partially flexible, designed for storage, for example, of the general type that forms a pocket.

As above, and as illustrated by FIG. 27, the piece 2 can be a port 2a that has an end opening 3, which is part of a receptacle 4 for storage or treatment, comprising in addition a pocket 5 that has a bottom 6 and opposite the bottom 6 an opening 7 that is designed to be combined rigidly, or is combined rigidly, with the second piece 2 opposite its end opening 3. As above, treatment means 21, such as, for example, mixing means 21, can be provided in the pocket 5.

Such a third piece 27 comprises an annular end part 26, on the side of which it is attached rigidly and in an airtight way, if necessary in a removable way, to the first piece 1.

In one embodiment, the third piece 27 is a particularly flexible pocket (FIGS. 18A, 18B, 20A, 20B, 22A, 22B, 24A, 24B, 25A, 25B, 28A [sic], 26B, 27).

This embodiment can be the object of different variant embodiments.

In a variant embodiment shown in FIGS. 18A, 20A, 22A, 24A and 24B, the third piece 27 originally comprises an axial opening 31a in the XX axis and opposite its annular end part 26.

In another variant embodiment shown in FIGS. 18B, 20B, 22B, the third piece 27 is permanently closed at its end part 31b, opposite its annular end part 26. With such an embodiment, it is possible to make use of the end part 31b that is permanently closed to provide there a means for hooking the third piece 27, such as an eyelet 29.

In another variant embodiment shown in FIGS. 25A, 25B, the third piece 27 originally comprises, opposite its annular end part 26, a lateral opening 31c. With such an embodiment, with the end part 31b being permanently closed, it is also possible to arrange there a hooking means of the third piece 27, such as an eyelet 29.

In another embodiment, the third piece 27 is an open tube opposite its annular end part 26 and is connected to a pocket or the like (FIGS. 19A, 19B, 21A, 21B, 23A, 23B).

In the embodiments of FIGS. 18A, 18B, 19A and 19B, the third piece 27 is directly combined fixedly and rigidly to the first piece 1, with the expanded terminal section of the annular end part 26 being rigidly attached, for example by welding, to the part 34 of the transverse wall 14 forming the edge of the opening 23.

In the embodiments of FIGS. 20A, 20B, 21A, 21B, 22A, 22B, 23A, 23B, 24A, 24B, 25A, 25B, 26A, 26B and 27, the third piece 27 is indirectly combined fixedly and rigidly to the first piece 1 by means of a tubular piece 24. Actually, the tubular piece 24 is combined fixedly and rigidly, on the one hand, to the first piece 1, and, on the other hand, to the third piece 27 by being placed between them and by ensuring an airtight passage between them. With such an arrangement, the first piece 1 that is equipped with the tubular piece 24 ensures in combination a function of connection and rigid attachment with the third piece 27 and a function of passage or transfer, in particular of a product and/or a means for treatment and/or measurement, with the end opening 3 of the second piece 2 actually remaining open.

Such a tubular piece 24 delimits the opening 23 and forms a rigid unit extending toward the exterior and/or the interior of the latter with the first piece 1. For example, the tubular piece 24 combined with the central opening 23a extends toward the exterior and the interior, while the tubular pieces 24 combined with the lateral openings 23 extend only toward the exterior. Subsequently, the focus will be more specially on the tubular pieces 24 that extend only toward the exterior or to the exterior part of the tubular pieces 24 that extend toward the exterior and the interior. Such a tubular piece 24 or such an exterior part of the tubular piece 24 acts as a fluid connection between the first piece 1 and the third piece 27.

According to the embodiments, the tubular connecting piece 24 is rigid, in particular more rigid than the first piece 1 and the third piece 27, or, in contrast, the tubular connecting piece 24 has a certain deformation capacity.

So that the tubular connecting piece 24 can form a stationary, rigid and airtight unit with the first piece 1, it is provided, for example, to supply it at one of its ends, in this case at the end adjacent to the first piece 1, with a collar 32, directed radially toward the exterior.

This collar 32 can be attached in a rigid and airtight way by gluing, welding, or the like, to the part 34 of the transverse wall 14 that forms the edge of the opening 23.

The tubular connecting piece 24 is combined in a stationary, rigid and airtight way to the third piece 27. For this purpose, the tubular wall 40 of the tubular connecting piece located on the side opposite to the collar 32 can be attached in a rigid and airtight way—by gluing, welding, or the like—to the annular end part 26 of the third piece 27, with the end-of-travel locking of the mounting of the third piece 27 on the tubular connecting piece 24 being ensured, provided that it is necessary, by the locking of the free end edge of the annular end part 26 on the collar 32 or the adjacent wall 14.

In the embodiment of FIGS. 20A, 20B, 21A, 21B, 22A, 22B, 23A, 23B, 24A, 24B, 25A, 25B, 26A, 26B and 27, the tubular connecting piece 24 comprises, forming a rigid unit with it, a transverse collar 25, adjacent to the tubular wall 40 toward the collar 32, directly radially toward the exterior, which may or may not be continuous. When the third piece 27 is attached to the first piece 1, the collar 25 is located on the exterior of the transverse wall 14, in particular in the vicinity of the latter.

This transverse collar 25 can constitute a means for suspension of the third piece 27, working with a support wall 41 that is provided with a hole 42. In such a case, the third piece 27 is arranged with its annular end part 26 directed upward, in such a way that the transverse collar 25 rests on the upper surface of the support wall 41 in the vicinity of the hole 42, while the third piece 27 is suspended below the support wall 41 (FIG. 26A).

Optionally, the transverse collar 25 can constitute an end-of-travel locking for the free end edge of the annular end part 26.

In the embodiment of FIGS. 22A, 22B, 23A, 23B, the tubular piece 24 comprises, toward the exterior of the tubular wall 24, an exterior cylindrical wall 28, providing with the tubular wall 24 an annular cylindrical housing 28*a* that can accommodate the annular end part 26.

In the embodiment of FIGS. 24A, 24B, 25B, 26B and 27, there is also provided a removable closing piece 30, such as a clamp, designed to be combined with the flexible annular end part 26 of the third piece 27 with the function of closing or opening the passage that is formed by the latter, so as, respectively, to prevent, or, on the contrary, to allow the passage of the contents of the third piece 27 into the pocket that is part of the second piece 2.

If necessary, the closing piece 30 can be combined also with the flexible tubular piece 24, with the function of opening or closing the passage that is formed by the latter.

Reference is now made more specially to FIGS. 24A and 24B, and the process for using a unit comprising—in addition to the pieces 1 and 2—a third piece 27 in the form of a pocket 27 originally comprising, in the XX axis and opposite its annular end part 26, an axial opening 31*a* is described. This process is designed to insert in an aseptic way—or in an at least protected way—a product such as a product P in powder form into the pocket 5 that is combined with the second piece 2, by means of the pocket 27 that forms the third piece 27.

The starting point is a situation in which a receptacle 4 that comprises a pocket 5, a second piece such as a port 2*a*, a first piece 1 with an opening 23 and a pocket 27 (third piece) that has an axial opening 31*a* opposite to the annular end part 26 is used, whereby this pocket 27 (third piece) is connected in a rigid and airtight way to the first piece 1, directly or indirectly by means of a tubular piece 24, as it was described above.

A closing piece 30 is combined with the annular end part 26 of the pocket 27 (third piece), and it is maneuvered in a suitable way for closing the passage that is formed by the latter.

With the pocket 27 (third piece) being always open owing to the opening 31*a*, opposite its annular end part 26 that is closed owing to the closing piece 30, the desired quantity of product P (FIG. 24A) is introduced into the pocket 27 by the opening 31*a*. Preferably, this stage is implemented whereas the opening 31*a* is placed in a higher position, for obvious reasons of ease, with the pocket 27 (third piece) extending downward and the pocket 5 being placed in a lower position.

Next, the opening 31*a* of the pocket 27 (third piece) is closed, for example by a transverse thermal welding 43*a*, or any other equivalent means. By so doing, the product P that is packaged in the pocket 27 (third piece) (FIG. 24B) is thus stored.

The first piece 1 is then mounted or assembled on and in the second piece 2, as disclosed above. In this situation, there is no communication between the pocket 27 (third piece) that contains the product P and the pocket 5 of the receptacle 4.

When it is desired that the product P be introduced into the pocket 5, the closing piece 30 is maneuvered in a suitable manner for opening the passage that is formed by the annular end part 26 of the pocket 27 (third piece).

With communication then being established between the pocket 27 and the pocket 5 of the receptacle 4, the product P that was previously stored in the pocket 27 (third piece) is sent into the pocket 5 of the receptacle 4. Preferably, this stage is implemented as above whereas the annular end part 26 of the pocket 27 (third piece) is placed in a lower position for obvious reasons of ease, with the product P being able to pass by gravity from the pocket 27 (third piece) to the pocket 5 of the receptacle 4 that is placed below.

Reference is now made more specially to FIGS. 25A and 25B whose object is a variant of the process that was just described.

In this variant of the process, a pocket 27 (third piece) that originally comprises not an axial opening 31*a* but a lateral opening 31*c* is used, with the pocket 27 (third piece) comprising a hooking means such as an eyelet 29 at its closed end part 31*b*.

This variant of the process is identical to the preceding one, except that the product P is inserted into the pocket 27 (third piece) not by an axial opening such as 31*a* but by the lateral opening 31*c*, the opening 31*c* of the pocket 27 (third piece) is next closed, for example by a thermal welding of axial and non-transverse direction 43*b*, and finally the pocket 27 (third piece) is conveniently held with its closed end part 31*b* in a higher position and its annular end part 26 is held in a lower position, by simple suspension by gravity, being suspended by the eyelet 29 with a suitable support hook.

Reference is now made more specially to FIGS. 26A and 26B, and the process of using a unit that comprises—in addition to the pieces 1 and 2—a third piece 27 in the form of a pocket 27 (third piece) that has a closed end part 31*b* is described.

The starting point is a situation in which use is made of a receptacle 4 that comprises a pocket 5, a second piece such as a port 2*a*, a first piece 1 with an opening 23, and a pocket 27 (third piece) having a closed end part 31*b*, whereby this pocket 27 (third piece) is connected in a rigid and airtight way to the first piece 1, directly or indirectly by means of a tubular piece 24, as it was described above.

The desired quantity of the product P is introduced into the pocket 27 (third piece) by the terminal opening of the annular end part 26. Preferably (FIG. 26A), this stage is implemented for obvious reasons of ease, whereas the pocket 27 (third piece) is used with its annular end part 26 in a higher position and its closed end part 31b in a lower position, which is made possible by the fact that the tubular connecting piece 24 of the pocket 27 (third piece) with the first piece 1 comprises, as described above, a transverse collar 25 that works with the support wall 41 that has a hole 42. The product P is then introduced into the pocket 27 (third piece) by simple gravity.

Then, a closing piece 30 is combined with the end part 26 of the pocket 27 (third piece), and it is maneuvered for closing the passage that is formed by the latter. The product P that is packaged in the pocket 27 (third piece) is thus stored.

The first piece 1 is then mounted or assembled on and in the second piece 2, as disclosed above. In this situation, there is no communication between the pocket 27 (third piece) that contains the product P and the pocket 5 of the receptacle 4.

When it is desired that the product P be introduced into the pocket 5, the closing piece 30 is maneuvered in a suitable manner to open the passage that is formed by the annular end part 26 of the pocket 27 (third piece).

With communication then being established between the pocket 27 and the pocket 5 of the receptacle 4, the product P previously stored in the pocket 27 (third piece) is sent into the pocket 5 of the receptacle 4.

Preferably, this stage is implemented after top-bottom turnaround of the pocket 27 (third piece), with the annular end part 26 of the pocket 27 (third piece) previously in a higher position being brought into a lower position, and the closed end part 31b previously in a lower position being brought into a higher position, with the pocket 27 (third piece) being suspended by gravity by the eyelet 29 with a suitable support hook. Thus, the product P can pass by gravity from the pocket 27 (third piece) to the pocket 5 of the receptacle 4 placed below.

The invention claimed is:

1. A first piece (1) that is adapted to be mounted in a stationary and rigid, removable and airtight manner, on a rigid annular collar (8) of a second piece (2) that has one end opening (3), the first piece comprising:
    a transverse wall (14) that can come into the opening (3);
    an annular wall that forms a skirt (15), having an interior surface (15a) that resists expansion under an external force in the direction of expansion;
    a hollow, toroidal holding chamber (45), adjacent to the interior surface (15a) of the skirt (15) and located toward the interior of the latter, deformable between a retracted state in which it is flattened on itself, and an expanded state in which it is broadened and filled with an inflation medium that is nearly incompressible;
    at least one entry/exit port (46) for the inflation medium in fluidic communication with the holding chamber (45) and accessible from the exterior of the skirt (15), able to allow the entry or exit of the inflation medium into or from the toroidal holding chamber (45); and
    a valve (52) that is located on the exterior of the skirt (15);
    wherein dimensions are selected, relative to those of the collar (8), in such a way as to be able, when the holding chamber (45) is in the retracted state, to be slipped onto or slipped off of the second piece (2) and when the holding chamber (45) is in the expanded state to be mounted in a stationary and rigid and airtight manner on the collar (8), with a mating part (47a) of an internal surface (47) of the holding chamber (45) being in airtight contact with a mating part (10b) of an exterior surface (10) of the collar (8);
    wherein:
    the transverse wall (14), with inherent sealing, is either continuous and solid or comprises at least one passage opening (23);
    the interior surface (15a) of the skirt (15) comprises:
        a cylindrical part (39a) of larger diameter adjacent to the transverse wall (14),
        a cylindrical part (39b) of smaller diameter that is separated axially from the transverse wall (14), between axial end parts (49, 50) from which an annular groove (48) is provided, with the toroidal holding chamber (45) being held by, and at least partially housed in, the annular groove (48), with the skirt (15) carrying the holding chamber (45), and
        an intermediate connecting part (39c) of tapered shape, adjacent to the part (39a) of larger diameter and to the part (39b) of smaller diameter;
    wherein the interior surface (15a) of the skirt (15) has a shape that is complementary with the exterior surface (10) of the collar (8), except for the annular groove (48), with the intermediate part (39c) coming into contact with the mating part (10c) of the exterior surface (10), the first piece (1) taken as a whole being able to be deformed by bending so that it can be slipped on and slipped off of the second piece (2);
    the first piece (1) being made of a material that is suited to the biopharmaceutical field, the first piece sealing with the second piece (2) when the transverse wall (14) is continuous and solid, or being connected with communication to the second piece (2) when the transverse wall (14) comprises a passage opening (23).

2. The first piece (1) according to claim 1, wherein the toroidal holding chamber (45) is an element that is separate from the skirt (15), connected to it, the annular groove (48), in a shape that is at least partially complementary with that of the toroidal holding chamber (45), having an opening (51) that is located in the interior surface (15a) of the skirt (15), with the mating part (47a) of the holding chamber (45) being located radially facing the opening (51) of the groove (48), the at least one entry/exit port (46) passing through the skirt (15) into its part (39b) of smaller diameter of its interior surface (15a).

3. The first el piece (1) according to claim 1, wherein the skirt (15) has the same radial thickness facing the part (39a) of larger diameter and facing the part (39b) of smaller diameter facing the toroidal holding chamber (45), and the skirt has a larger radial thickness facing the skirt's axial end parts (49, 50) of smaller diameter, with the interior diameter of the mating part (47a) of the internal surface (47) of the holding chamber (45) in the expanded state being equal or slightly less than the interior diameter of the part (39b) of smaller diameter of the skirt (15) radially facing its axial end parts (49, 50) of smaller diameter.

4. The first piece (1) according to claim 1, wherein the intermediate part (39c) of the interior surface (15a) of the skirt (15) has a tapered shape.

5. The first piece (1) according to claim 4, further comprising a third piece (27) having a shape of an open pocket or a tube.

6. The first piece (1) according to claim 5, further comprising a closing piece (30) that is combined with the third piece (27).

7. The first piece (1) according to claim 1, in the case where the transverse wall (14) comprises a passage opening (23), wherein it also comprises a tubular piece (24), delimiting the opening (23), made integral with the transverse wall (14) for forming a rigid unit that extends toward the exterior and/or the interior of the transverse wall (14), whereby the first piece (1), equipped with the tubular piece (24), ensures a function of connection and rigid attachment and passage or transfer, with the tubular piece (24) extending toward the exterior of the transverse wall (14).

8. The first piece (1) according to claim 7, further comprising a tubular piece (24) that extends toward the exterior of the transverse wall (14), comprising a tubular wall (40) for accommodation and the rigid and airtight attachment of an annular end part (26) of a third piece (27) and at an end of the tubular wall (40), with a collar (32) for the rigid attachment to the part (34) of the transverse wall (14) forming the edge of the opening (23), and comprising, toward the exterior of the tubular wall (40), an exterior cylindrical wall (28), providing with the wall (40) an annular cylindrical housing (28a) that accommodates the annular end part (26) of the third piece (27), and comprising, forming a rigid unit with the third piece, a transverse collar (25), directed toward the exterior, able to constitute a means for suspension of the third piece (27), working with a support wall (41) that has a hole (42).

9. The first piece (1) according to claim 1, in the case where the transverse wall (14) comprises a passage opening (23), further comprising a third piece (27) that has an annular end part (26), which is able to be, or is, attached directly to the part (34) of the transverse wall (14) that forms the edge of the opening (23).

10. The first piece (1) according to claim 1, further comprising a first annular peripheral sealing means (16) in the form of a rounded bead in a transverse straight cross-section and located close to the skirt (15), and a second mating annular peripheral sealing means (12) in the form of a rounded groove in a transverse straight cross-section, provided on the end edge (11) of the collar (8).

11. The first piece (1) according to claim 1, further comprising at least one exterior peripheral tab (17) that is adjacent to the free edge (18) of the skirt (15).

12. The first piece (1) according to claim 1, wherein the transverse wall (14) and the skirt (15) are made of silicone or an equivalent material and/or wherein the holding chamber (45) is made of silicone or an equivalent material if it is inflated with a liquid or butyl or an equivalent material if it is inflated with a gas, with the butyl being coated toward the exterior with a material that is acceptable in the biopharmaceutical field, wherein the constituent materials of the mounting piece (1) are antistatic.

13. A unit comprising the first piece (1) according to claim 1, and a second piece (2) on which the first piece is mounted in a stationary and rigid, removable and airtight manner, wherein the second, piece (2) comprises an end opening (3) that is delimited by a rigid annular collar (8) that has, on the side of the opening (3), a bulge (9) directed toward the exterior, the exterior surface (10) of the collar (8) comprising a part (10a) of larger diameter toward the bulge (9) and the opening (3), a part (10b) of smaller diameter separated from the bulge (9) and the opening (3), and an intermediate part (10c), in such a way that in the active state where the first piece (1) is mounted on the second piece (2), the mating part (47a) of the internal surface (47) of the holding chamber (45) comes into contact with holding tightening and sealing on the mating part (10b) of the exterior surface (10) of the collar (8) of the second piece (2), with the first piece (1) having quick installation and removal on the second piece (2).

14. The unit according to claim 13, wherein the second sealing means (12) is provided on the end edge (11) of the collar (8) that forms the bulge (9), with which, when it is provided, a first annular peripheral sealing means (16) works in the form of a rounded bead in a transverse straight cross-section and located close to the skirt (15).

15. The unit according to claim 13, wherein the second piece (2) is a port (2a) that is part of a storage or treatment receptacle (4), also comprising a pocket (5) that has a bottom (6), and, opposite the bottom (6), an opening (7) that is designed to be combined rigidly, or is combined rigidly, with the second piece (2) opposite its end opening (3), and a flexible lateral wall (20) that can be found in two end states, respectively flat-folded and deployed, and in any intermediate state, and can be deformed for switching from one state to the next.

16. The unit according to claim 15, wherein the receptacle (4) comprises means (21) for treatment of its contents.

17. The unit according to claim 16, wherein the treatment means (21) are arranged at least partly in the interior of the pocket (5) by being adjacent to its bottom (6), opposite the second piece (2) that forms a port (2a).

18. The unit according to claim 15, wherein the second piece (2) that forms a port (2a) also constitutes means for protection of the treatment means (21), with their active internal part being essentially arranged in the internal space of the second piece (2) forming a port (2a) when the pocket (5) is in the flat-folded state, with the peripheral part of the internal space of the second piece (2) forming a port (2a) that forms a chamber for protection of the pocket (5) and treatment means (21).

19. The unit according to claim 13, wherein the second piece (2) is a tube.

20. The unit according to claim 13, in which the transverse wall (14) is continuous and solid, with the first piece (1) sealing the second piece (2).

21. The process for using a unit according to claim 20, in which:
   a receptacle for storage or treatment (4) is used;
   the starting point is a situation wherein:
   the pocket (5) of the receptacle (4) is in the flat-folded state,
   the end opening (3) of the port (2a) of the receptacle (4) that forms the second piece (2) is concealed by the first piece (1) arranged toward the top and mounted on and assembled in the second piece (2), and
   the pocket (5) is placed by its bottom on the bottom of the container (19);
   wherein with an opening (22) for introducing the product from the receptacle (4) being open, a product is gradually introduced into the receptacle (4), and simultaneously the pocket (5) is allowed to be deployed upward and to be expanded in volume by the container (19) until the desired quantity of product has been introduced into the receptacle (4);
   the first piece (1) is disassembled from the second piece (2), and the end opening (3) of the second piece (2) is thus opened;
   wherein with this end opening (3) of the second piece (2) thus being opened, a product and/or a means for treatment and/or for measuring the contents of the pocket (5) is introduced through this end opening into the pocket (5), and once this last stage has ended, the first piece (1) is mounted or assembled on and in the second piece (2).

22. The process according to claim 21, wherein the receptacle (4) comprises treatment means (21) comprising mixing means arranged in the interior of the pocket (5) by being adjacent to its bottom (6), in which:
   with the end opening (3) of the port (2a) of the receptacle (4) that forms the second piece (2) being concealed by the first piece (1) and with an opening (22) for introducing the product of the receptacle being open, the desired quantity of a product is introduced into the receptacle (4);

the first piece (1) is disassembled from the second piece (2), and the end opening (3) of the second piece (2) is thus opened;

with this end opening (3) of the second piece (2) thus being open, a desired quantity of a product is introduced by this end opening into the pocket (5);

the mixing means (21) are used;

the first piece (1) is mounted or assembled on and in the second piece (2); and implementation of the mixing means (21) is continued.

23. The unit according to claim 13, wherein the transverse wall (14) comprises at least one passage opening (23), with the first piece (1) being connected with communication to the second piece (2).

24. The unit according to claim 23, further comprising a third piece (27) that comprises an annular end part (26) that is connected in a rigid and airtight way to the first piece (1), directly or by means of the tubular piece (24), and a closing piece (30) combined with the third piece (27).

25. The process for using a unit according to claim 24, in the case where the third piece (27) is an open pocket opposite its annular end part (26), for the purpose of inserting a product P into the receptacle (4) via the third piece (open pocket 27), in which:

a receptacle (4) for storage or treatment comprising a pocket (5) and the third piece (open pocket 27) connected in a rigid and airtight manner to the first piece (1) is used;

a closing piece (30) is combined with the end part (26) of the third piece (open pocket 27), and it is maneuvered to close the passage that is formed by the annular end part (26);

with the third piece (open pocket 27) being open opposite its thus closed annular end part (26), the desired quantity of the product P is introduced by this part into this third piece (pocket 27);

the opening of the third piece (pocket 27) opposite its closed annular end part (26) is closed; and the first piece (1) is mounted or assembled on and in the second piece (2), with no communication then existing between the pocket (5) of the receptacle (4) for storage or treatment and the third piece (pocket 27);

the product that is inserted into the third piece (pocket 27) is sent into the pocket (5) of the receptacle (4) for storage or treatment.

26. The process for using a unit according to claim 24, in the case where the third piece (27) is a closed pocket opposite its annular end part (26), for the purpose of inserting a product P into the receptacle (4) via the third piece (closed pocket 27), in which:

a receptacle (4) for storage or treatment comprising a pocket (5) and the third piece (closed pocket 27) connected in a rigid and airtight manner to the first piece (1) is used;

with the third piece (pocket 27) being open at its annular end part (26), the desired quantity of the product P is introduced by this part into this third piece (pocket 27);

a closing piece (30) is combined with the end part (26) of the third piece (pocket 27), and it is maneuvered for closing the passage that is formed by the annular end part (26);

the first piece (1) is mounted or assembled on and in the second piece (2), with no communication then existing between the pocket (5) of the receptacle (4) for storage or treatment and the third piece (pocket 27) containing the product P; and the product P that is inserted into the third piece (pocket 27) is sent into the pocket (5) of the receptacle (4) for storage or treatment.

27. Process for mounting or assembly of the first piece (1) on and in the second piece (2) of the unit according to claim 13, wherein:

the first piece (1) and a second piece (2) that are not mounted or assembled with one another are used, with the holding chamber (45) of the first piece (1) being in the retracted state;

the first piece (1) is positioned opposite and in the axis of the second piece (2);

the skirt (15) is slipped onto the collar (8), and the first piece (1) is positioned axially on the second piece (2);

wherein, in this position, the holding chamber (45) of the first piece (1) is switched from the retracted state to the expanded state so that, in this situation where the first piece (1), in the active state, is mounted or assembled on the second piece (2), the mating part (47*a*) of the internal surface of the holding chamber (45) comes into contact with holding tightening and sealing on the mating part of the exterior surface (10*b*) of the collar (8) of the second piece (2).

28. The process according to claim 13, wherein:

the first piece (1) and a second piece (2) that are mounted or assembled with and on one another are used, with the holding chamber (45) of the first piece (1) being in the expanded state;

the holding chamber (45) of the first piece (1) is switched from the expanded state to the retracted state; and the first piece (1) is slipped off of the second piece (2), until the two pieces (1, 2) are disassembled.

* * * * *